United States Patent
Zabele et al.

(10) Patent No.: US 7,391,742 B2
(45) Date of Patent: Jun. 24, 2008

(54) METHODS AND SYSTEMS FOR DETERMINING A SET OF COSTS OF ROUTES IN A NETWORK

(75) Inventors: Steven M. Zabele, North Reading, MA (US); Mark Keaton, North Reading, MA (US)

(73) Assignee: BAE Systems Advanced Information Technologies, Inc., Burlington, MA (US)

( * ) Notice: Subject to any disclaimer, the term of this patent is extended or adjusted under 35 U.S.C. 154(b) by 560 days.

(21) Appl. No.: 10/955,466

(22) Filed: Sep. 30, 2004

(65) Prior Publication Data

US 2005/0073962 A1    Apr. 7, 2005

Related U.S. Application Data

(60) Provisional application No. 60/508,633, filed on Oct. 3, 2003.

(51) Int. Cl.
*H04L 12/28* (2006.01)
*G06F 15/177* (2006.01)

(52) U.S. Cl. ...................... 370/254; 709/222

(58) Field of Classification Search ............. None
See application file for complete search history.

(56) References Cited

U.S. PATENT DOCUMENTS

2002/0044533 A1    4/2002    Bahl et al.
2003/0033394 A1*   2/2003    Stine ..................... 709/222

OTHER PUBLICATIONS

Chang, Jae-Hwan, et al.; "Energy Conserving Routing in Wireless Ad-hoc Networks," IEEE Infocom 2000 Tel-Aviv, Israel, Mar. 2000 pp. 22-31.
PCT International Search Report dated Feb. 9, 2007 of International Application No. PCT/US04/032066 filed Sep. 30, 2004.

* cited by examiner

*Primary Examiner*—Huy D. Vu
*Assistant Examiner*—Clemence Han
(74) *Attorney, Agent, or Firm*—Foley Hoag LLP; Stephen B. Deutsch; Daniel J. Long

(57) ABSTRACT

Described are methods, systems, and processor program products for determining a set of costs of routes in a network, including providing a model of the network, optimizing the model for maximum network lifetime, updating the model using at least one constraint based on the maximum network lifetime, optimizing the updated model for minimum network latency, modifying the updated model using a constraint based on the minimum network latency, and, optimizing the modified updated model by balancing the network across multiple pathways to provide costs of routes in the network.

19 Claims, 24 Drawing Sheets

METHODS AND SYSTEMS FOR DETERMINING A SET OF COSTS OF ROUTES IN A NETWORK

CLAIM OF PRIORITY

This application claims priority to U.S. Ser. No. 60/508,633 filed on Oct. 3, 2003, the contents of which are herein incorporated by reference in their entirety.

STATEMENT OF GOVERNMENT INTEREST

At least a portion of the disclosure herein was developed in accordance with solicitation NSF 02-056, Proposal 0349676, and/or SBIR award 0232169, and accordingly, the U.S. government may have certain rights in the disclosed methods and systems.

BACKGROUND (1) Field

The disclosed methods and systems relate generally to routing schemes, and more particularly to routing techniques that improve network lifetime and latency.

(2) Description of Relevant Art

Ad-hoc networks generally can be understood to be a collection of wireless hosts forming a temporary network without the support of centralized administration and/or support services typically associated with infrastructure-based networks such as wide area networks. Mobile ad hoc networks extend the notion of ad hoc networks to include cases where nodes are allowed to move relative to each other such that the routing topology itself is dynamic. As provided herein, ad hoc networks and mobile ad hoc networks will be referred to collectively as ad hoc networks.

Ad hoc networks can be used, for example, in an emergency situation where emergency personnel may need unencumbered access to situational awareness information and/or to share information with others. Given the likely disruption of public communications infrastructure due to, for example, subscriber overload during crisis situations, the use of wireless communication devices is essential to emergency personnel. Ideally, these wireless devices should be portable, lightweight, and have long battery life. As a result, these devices have limited range. The aforementioned ad-hoc networks allow for multi-hop configurations so that users who are otherwise out of range of each other can still communicate.

The lifetime of an ad hoc network as a whole is clearly subject to the battery capacity of constituent node devices. Moreover, not only are the bandwidths of these wireless devices necessarily limited, but the capacity of any given wireless link is in general varies as a function of the signal-to-noise ratios observed between the end nodes. Routing algorithms should therefore consider link capacity, available node energy, and traffic load in optimizing the performance of ad hoc networks.

Traditional "shortest path" schemes that are employed in ad-hoc network routing typically yield routing topologies where small numbers of network paths are heavily used. Such schemes can cause path contention, which increases latency through queueing delay, reduces throughput, and induces disproportionately heavy leads on a few network nodes (e.g., devices). Uneven loading can cause premature network failure due to accelerated draining of node device batteries at one or more critical nodes.

Some research regarding ad-hoc network routing includes energy conservation routing techniques to ameliorate the aforementioned battery problem; however, such energy routing techniques if used by themselves as standalone algorithms can more than triple latency, create energy-wasting routing loops, and are sensitive to traffic load assumptions.

SUMMARY

The disclosed methods and systems provide for routing schemes that improve network lifetime and latency while making the routing solution less sensitive to network traffic load assumptions. In example embodiments, the networks are ad-hoc networks, although the methods, systems, and processor program products are not limited to ad-hoc networks. The disclosed methods and systems illustrate mathematical optimization of network lifetime and network latency, and subsequently a mathematical optimization that reduces solution sensitivities to assumed traffic loads.

Disclosed are methods, systems, and processor program products for determining a set of costs of routes in a network, including: providing a model of the network, optimizing the model for maximum network lifetime, updating the model using a constraint based on the maximum network lifetime, optimizing the updated model for minimum network latency, modifying the updated model using a constraint based on the minimum network latency, and, optimizing the modified updated model by balancing the network across multiple pathways to provide the costs. Providing a model comprises specifying at least one constraint based on the energy of nodes in the network, for example, a constraint based on an initial battery energy of nodes in the network. In an embodiment, providing a model comprises specifying at least one constraint based on available node communications capacity for nodes in the network.

Optimizing the model for maximum network lifetime can include determining a maximum (achievable) network lifetime, and also, updating the model using a constraint based on the maximum network lifetime can include constraining the model based on a percentage of the maximum network lifetime, where the percentage can be between zero and one-hundred.

Optimizing the updated model for minimum network latency can include determining the minimum number of relays to communicate information between network nodes based on the maximum network lifetime. The constraint(s) based on the maximum network lifetime can include a percentage of the maximum network lifetime, where the percentage can be between one and one-hundred. Accordingly, modifying the updated model using a constraint based on the minimum network latency can include constraining the updated model based on a multiplier of the number of relays, where the multiplier can be greater than or equal to one.

In an embodiment, optimizing the modified updated model by balancing the network across multiple pathways includes optimizing using quadratic programming. As is understood in the art, the quadratic programming provides the costs.

In some embodiments, the methods and systems can include providing a model of the network, optimizing the model for minimum network latency, updating the model using at least one constraint based on the minimum network latency, optimizing the updated model for maximum network lifetime, modifying the updated model using at least one constraint based on the maximum network lifetime, and, optimizing the modified updated model by balancing the network across multiple pathways to provide the costs.

Also disclosed are methods, systems, and processor program products for computing a set of costs of routes in a network, where such systems and methods can include a fast approximation, and may include constructing a list of selected nodes that includes nodes for which an optimal route to a core node is identified, associating therewith a nexthop to reach the core node and a cost to reach the core node through the nexthop, constructing a list of available nodes which have been selected and have neighbors which have not been selected, for each of the available nodes, identifying an available node and computing a cost of each unselected neighbor to reach the core node through the identified available node, selecting the identified available node and unselected neighbor having the lowest cost, generating alternative nexthops by constructing a list of selected neighbors having a cost to reach the core through the identified available node, the cost within a threshold, removing the identified available node from the available node list if the identified available node has no unselected neighbors, adding the unselected neighbor having the lowest cost to the available node list if said neighbor node has unselected neighbors, and, returning to identifying an available node until the available node list is empty.

Also disclosed are systems and processor program products for implementing the disclosed methods. For example, disclosed are processor program products disposed on a processor readable medium and having instructions to optimize a model of a network for maximum network lifetime, update the model using at least one constraint based on the maximum network lifetime, optimize the updated model for minimum network latency, modify the updated model using at least one constraint based on the minimum network latency, and, optimize the modified updated model by balancing the network across multiple pathways to provide the costs. As provided herein, the order of the lifetime and latency optimizations can be reversed in the disclosed methods, systems, and processor program products.

Other objects and advantages will become apparent hereinafter in view of the specification and drawings.

DESCRIPTION

Figure 1:
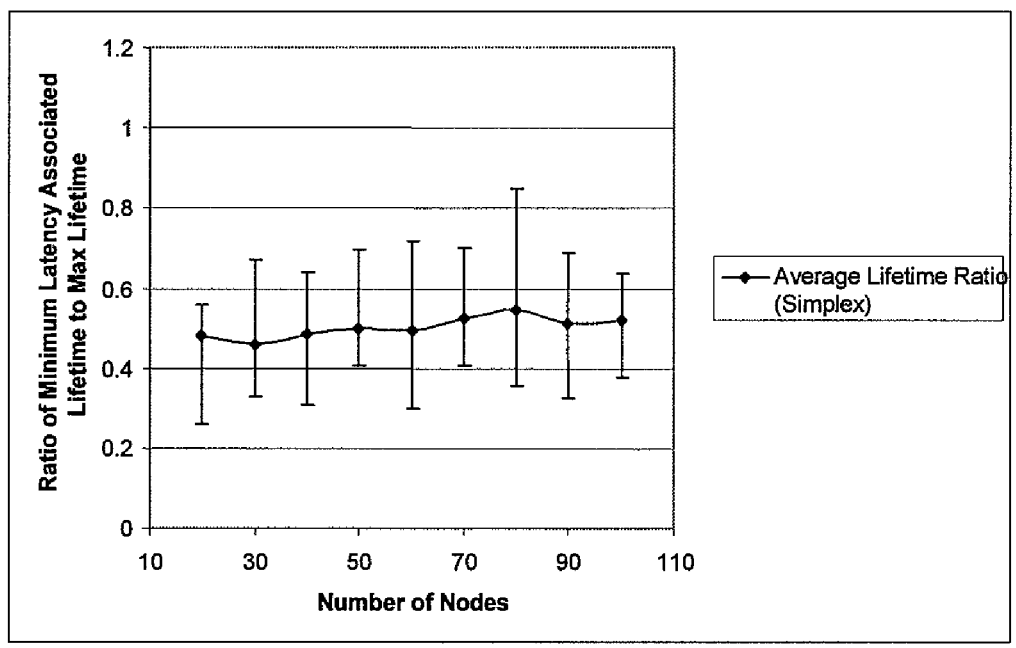
FIG. 1 is a plot of ratios of system lifetimes produced by Simplex-based shortest path optimizations.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

The disclosed methods and systems relate to network routing in ad-hoc networks. In contrast to minimum latency schemes and maximum lifetime schemes, the disclosed methods and systems mathematically optimize energy and latency by mathematically minimizing energy and latency. References herein to optimum, minimum, etc., can be understood to be with reference to the mathematical sense and/or context in which such terms are presented. Accordingly, as shown herein, "optimal" for one embodiment may be different than "optimal" for another embodiment, based on parameters associated with the embodiment.

Message delivery latency along a wireless network path of N nodes is based on complex relationships of multiple parameters including message and packet lengths, transmission rates, propagation delays, processing delays, and queue depths at intermediate nodes. Collectively, this set of parameters can be used to approximate the expected delivery latency of a network as expressed by Equation 1:

$$\text{Latency} \cong \sum_{i=1}^{N} \frac{L_{pkt}}{B_i} + \sum_{i=1}^{N-1} \frac{L_{pkt} \cdot Q_i}{B_{i+1}} + \sum_{i=1}^{N} \frac{D_i}{v_i} + \sum_{i=1}^{N} \Delta_i + \frac{(L_{msg}-1) \cdot L_{pkt}}{B_{min}} \qquad (1)$$

$$\approx N \left[ (1 + Q_{avg}) \frac{L_{pkt}}{B_{min}} + \frac{D_{avg}}{c} + \Delta_{avg} \right] + \frac{(L_{msg}-1) \cdot L_{pkt}}{B_{min}}$$

where:
Lpkt=length of packet (bits);
Lmsg=length of message (packets);
$B_i$=data rate (bit rate) of link i (bits/s);
$B_{min}$=min$\{B_i\}$;
$Q_i$=queue depth at node i (packets);
c=speed of light in freespace (m/s);
$D_i$=propagation length of link i (m);
N=number of hops;
$v_i$=speed of propagation over link i (m/s);
$Q_{avg}$=average queue depth (packets);
$\Delta i$=processing delay at link i terminal node(s);
$D_{avg}$=average hop distance (m); and,
$\Delta_{avg}$=average processing delay (s)

Based on the approximation expressions of Equation (1), reducing delivery latency may include (i) reducing the message size $L_{msg}$ (e.g., data compression); (ii) reducing the packet size $L_{pkt}$ (but at the cost of increased overhead); (iii) minimizing the number of hops N; (iv) maximizing throughput (find the path with largest minimum data rate $B_{min}$); (v) minimizing the average queue depth $Q_{avg}$ (find the path with minimal competing traffic); (vi) minimizing the propagation distance (sum of propagation link lengths $D_i$); and/or, minimizing processing delays $\Delta_i$.

To obtain a perspective on the primary sources of delivery latency, a set of parameter values was selected based on current military radio capabilities for insertion into the second approximation of Equation (1). With the parameters and subsequent component relationships shown in Equation (2), it can be understood that the dominant component in the delivery latency expression is the average transmission rate given by $L_{pkt}/B_{min}$.

$$\frac{L_{pkt}}{B_{min}} \gg \Delta_{avg} \gg \frac{D_{avg}}{c} \gg \frac{(L_{msg}-1) \cdot L_{pkt}}{B_{min}} \qquad (2)$$

where:
$L_{pkt}$=256 bit packets (UDP/IP=224 bits);
$D_{avg}$=0.3 Km;
$L_{msg}$=1 packet;
$B_{min}$=56 Kbps; and, $\Delta_{av}$=50 usec processing delays (measured on a Linux software router).

Accordingly, the end-to-end latency can be approximated by Equation 3.

$$\text{Latency} \approx N(1 + Q_{avg}) \frac{L_{pkt}}{B_{min}} \qquad (3)$$

From a routing perspective, the controllable parameters in the Equation (3) latency expression are the number of hops, N, and the average queue depth, Qavg, both of which are direct multipliers on the dominant term. Optimal routing schemes attempting to minimize latency will try to minimize the number of hops N (which is a multiplier on nearly all the terms), and accept the resulting queuing delays as a matter of course; however, since adding a single packet of queuing delay at each node effectively doubles the latency, (two packets of queuing delay triples the latency, etc.), ignoring the path contention that arises using standard optimal routing techniques can severely impact delivery latency.

Two basic types of "classic" optimal routing protocols include distance-vector protocols, of which the Routing Information Protocol (RIP) is an example, and link-state protocols, of which the Open Shortest Path First (OSPF) protocol is an example. Distance-vector (DV) protocols are characterized by the exchange of large amounts of cost information between small numbers of nodes. Specifically, each node provides its current notion of the minimum cost path and an associated next hop for reachable destinations only to its immediate neighbors. As such, only partial knowledge of the topology is maintained at each node. Optimal routes for each destination are (re)computed after each exchange using the Bellman-Ford scheme. A majority of current generation MANET routing protocols are DV-based.

In contrast, link-state (LS) protocols are characterized by the exchange of small amounts of cost information between large numbers of nodes. Specifically, each node provides other nodes in its routing domain with its cost to reach each of its immediate neighbors. As such, LS protocols develop and maintain a complete description of the routing topology as part of its normal operation, in contrast with DV protocols. Optimal routes for each destination are (re)computed after each exchange using the Dijkstra scheme. The communications overhead needed for route maintenance using LS protocols is actually smaller than that for DV protocols, at the expense of somewhat increased computational load.

Both the Bellman-Ford and the Dijkstra schemes admit the use of a variety of cost metrics, including hop count, delay, bandwidth, and monetary measures. The shortcoming of either scheme in terms of minimizing latency, however, is not due to the choice of metric, but rather the tendency of both techniques to produce routing topologies where a small number of "core" routes carry much of the traffic. With only a small number of routes carrying most of the traffic, path contention is unavoidable and a result includes queuing delays that can impact delivery latency.

As an example, consider the operation of the Bellman-Ford scheme. When a node receives an update from a neighbor advertising a lower cost path to a destination, the node updates its cost information and modifies its route so that all packets for that destination address are forwarded through that neighbor. Hence, a neighbor offering a low cost path to one or more destinations is in fact inviting all upstream routers to forward packets through it along the same path. The results are routing topologies with a strong tendency for establishing common paths.

The additional topology information available within a LS routing approach can provide other alternatives. Since each node has identical information to every other node, each node can, using substantially identical calculations, predict the route all other nodes will select to reach any given destination. As such, each node can then construct a route to any given destination that minimizes the expected path contention integrated across the set of all possible send nodes. This approach, referred to as Power-aware Latency Minimized Statistical Routing (PALMS), not only reduces the expected delivery latency, but also distributes delivery across multiple parallel paths, thereby more evenly distributing energy consumption. In particular, using consumed energy as a cost metric, distributed energy consumption results directly from the optimization process.

A simulation using a set of routes to a central core node from all other nodes within a fixed radius was performed using the base Dijkstra scheme and the aforementioned PALMS approach. Such simulation showed a tendency of the Dijkstra approach to yield routing topologies with a small number of heavily loaded links; however the PALMS approach produced a considerably more diffused routing tree. Such a result can be inferred to result from a manner that PALMS network nodes leverage the multiple pathways. Specifically, PALMS uses Concurrent Multipath Routing (CMR) techniques to randomly route packets along the different possible paths on a packet-by-packet basis. This allows PALMS to distribute transmission load even when the traffic to a given receiver is largely from a single sender and part of the same flow. In some experimental embodiments, PALMS demonstrated an ability to keep networks alive twice as long when compared with shortest path schemes such as Dijkstra, while maintaining or even improving upon throughput and latency. Moreover, because of its intentional use of multipath, PALMS demonstrated superior robustness to differences between assumed and actual network loads.

In a maximum system lifetime problem formulation, a wireless networking configuration can be modeled as a directed graph $G(N, A)$ where $N$ is the set of all nodes and $A$ is the set of all directed links $(i, j)$ where $i, j \in N$. Let $S_i$ be the set of all nodes that can be reached by node $i$ with a certain power level in its dynamic range. It can be assumed that link $(i, j)$ exists if and only if $j \in S_i$. Let each node $i$ have the initial battery energy $E_i$, and let $Q_i^{(c)}$ be the rate at which information is generated at node $i$ belonging to commodity $c \in C$, where $C$ is the set of all commodities. Assume that the transmission energy for node $i$ to transmit an information unit to its neighboring node $j$ is $e_{i,j}$, and the rate at which information of commodity $c$ is transmitted from node $i$ to node $j$ is called the flow $q_{i,j}^{(c)}$. Further, let $Q_i$ and $q_{i,j}$ be the aggregate flows of all commodities, i.e., $$Q_i = \sum_{c \in C} Q_i^{(c)}, \text{ and} \quad (4A)$$

$$q_{i,j} = \sum_{c \in C} q_{i,j}^{(c)}. \quad (4B)$$

Further, given, for each commodity, a set of origin nodes $O^{(c)}$ where the information is generated, i.e., $$O^c = \{i | Q_i^{(c)} > 0, i \in N\}, \quad (5)$$

and a set of destination nodes $D^{(c)}$ among which any node can be reached for the information transfer of commodity c to be considered done.

The lifetime of node i under a given flow $q = \{q_{i,j}\}$ is given by $$T_i(q) = \frac{E_i}{\sum_{j \in S_i} e_{i,j} \sum_{c \in C} q_{i,j}^{(c)}} \quad (6)$$

Further, define system lifetime under flow q as the length of time until the first battery is completely drained among the set of all nodes in N, which is the same as the minimum lifetime over all nodes, i.e., $$T_{sys}(q) = \min_{i \in N} T_i(q) \quad (7)$$

$$= \min_{i \in N} \frac{E_i}{\sum_{j \in S_i} e_{i,j} \sum_{c \in C} q_{i,j}^{(c)}}$$

A determination of the flow that maximizes the system lifetime under the flow conservation condition can be thus expressed as:

$$\text{Maximize } T_{sys}(q) = \min_{i \in N} \frac{E_i}{\sum_{j \in S_i} e_{i,j} \sum_{c \in C} q_{i,j}^{(c)}} \quad (8)$$

subject to:

$$q_{i,j}^{(c)} \geq 0, \quad \forall i \in N, \forall j \in S_i, \forall c \in C \quad (9A)$$

$$\sum_{j: i \in S_j} q_{j,i}^{(c)} + Q_i^{(c)} = \sum_{k \in S_i} q_{i,k}^{(c)}, \quad \forall i \in N - D^{(c)}, \forall c \in C \quad (9B)$$

The issue of mathematically maximizing the system lifetime, given the information generation rates $Q_i^{(c)}$ at the set of origin nodes $O^{(c)}$, and the set of destination nodes $D^{(c)}$ for each commodity c, is equivalent to the following linear programming problem:

Maximize T (10)

such that $$\hat{q}_{i,j}^{(c)} \geq 0, \quad \forall i \in N, \forall j \in S_i, \forall c \in C \quad (10A)$$

$$\sum_{j \in S_i} e_{i,j} \sum_{c \in C} \hat{q}_{i,j}^{(c)} \leq E_i, \quad \forall i \in N, \quad (10B)$$

$$\sum_{j: i \in S_j} \hat{q}_{j,i}^{(c)} + TQ_i^{(c)} = \sum_{k \in S_i} \hat{q}_{i,k}^{(c)}, \quad \forall i \in N - D^{(c)}, \forall c \in C \quad (10C)$$

where $\hat{q}_{i,j}^{(c)} = T q_{i,j}^{(c)}$ is the amount of information of commodity c transmitted from node i to node j until time T. Subsequently herein, $T_{max}$ can be understood to be the maximum system lifetime value computed in this manner.

In casting the aforementioned problem as a linear program, the terms $\hat{q}_{i,j}^{(c)}$ can be treated as if they were independent of T, realizing that the intent of the Equation (10C) is to assert a conservation condition where the traffic into a given node i for a given destination, plus the locally generated traffic for that destination, is equal to the traffic out of node i.

Such a formulation can be leveraged to describe the minimum system latency problem, i.e., $$\text{Minimize } L = \sum_{i \in N, j \in S_i, c \in C} q_{i,j}^{(c)} \quad (11)$$

such that $$q_{i,j}^{(c)} \geq 0, \quad \forall i \in N, \forall j \in S_i, \forall c \in C \quad (11A)$$

$$\sum_{c \in C} \sum_{j:i \in S_j} q_{j,i}^{(c)} + \sum_{c \in C} \sum_{k \in S_i} q_{i,k}^{(c)} \leq B_i \quad \forall i \in N \quad (11B)$$

$$\sum_{j:i \in S_j} q_{j,i}^{(c)} + Q_i^{(c)} = \sum_{k \in S_i} q_{i,k}^{(c)}, \quad \forall i \in N - D^{(c)}, \forall c \in C \quad (11C)$$

where $B_i$ is the available node communications capacity for each node i. For wired networks, the capacity constraint is typically expressed individually for each directional link; however, for a wireless network, the usual notion of links is invalid since there is only a single transceiver which can either be sending or receiving at any given time. Hence, whereas adding a new link to a neighbor in a wired topology increases the capacity immediately available to the affected nodes, adding a neighbor (and by inference an implied link to that neighbor) does not affect the capacity available to any given node in a wireless network. (There is also a channel blocking effect which is not modeled, i.e., if four neighbors can all "see" each other, then only one of these may be sending at any given time. In the present disclosure, it is assumed that the commodity demands are sufficiently smaller than the individual node communications capacities, since most network applications rely on TCP-like protocols which self-adapt demands to the available capacity.)

The minimum system latency problem can also be expressed in terms of the variables $\hat{q}_{i,j}^{(c)}$ as:

$$\text{Minimize } \sum_{i \in N, j \in S_i, c \in C} \hat{q}_{i,j}^{(c)} \quad (12)$$

such that $$\hat{q}_{i,j}^{(c)} \geq 0, \quad \begin{array}{l}\forall i \in N, \forall j \in S_i, \\ \forall c \in C\end{array} \quad (12A)$$

$$TB_i - \sum_{c \in C} \sum_{j:i \in S_j} \hat{q}_{j,i}^{(c)} - \sum_{c \in C} \sum_{k \in S_i} \hat{q}_{i,k}^{(c)} \geq 0 \quad \forall i \in N \quad (12B)$$

$$\sum_{j:i \in S_j} \hat{q}_{j,i}^{(c)} + TQ_i^{(c)} = \sum_{k \in S_i} \hat{q}_{i,k}^{(c)}, \quad \begin{array}{l}\forall i \in N - D^{(c)}, \\ \forall c \in C\end{array} \quad (12C)$$

$$T \geq \varepsilon \text{ for some small, non-negative value } \varepsilon \quad (12E)$$

where the last constraint prevents the optimization from finding T=0 as a degenerate solution.

Once the solution to this alternate formulation is known (i.e., determined optimal values for $\hat{q}_{i,j}^{(c)}$ given by $\hat{q}_{i,j}^{(c)} = \check{q}_{i,j}^{(c)}$ and a corresponding value for T given by $T = \check{T}$), the minimum system latency $L_{min}$ is then computed as:

$$L_{min} = \frac{\sum_{i \in N, j \in S_i, c \in C} \check{q}_{i,j}^{(c)}}{\check{T}} \quad (13)$$

The minimum latency and maximum lifetime problems can be combined to describe the lifetime-constrained minimum system latency, where the maximum system lifetime problem is solved to obtain $T_{max}$, whereupon the constraint $T \geq \varepsilon$ is replaced in the minimum system latency problem with the constraint $$T \geq \alpha T_{max} \quad (14)$$

where the parameter $\alpha$ is a real number in the range $0 \leq \alpha \leq 1$. This constrained optimization formulation provides parametric control over a requirement for a maximum lifetime solution ($\alpha=1$), a minimum latency solution ($\alpha=0$), and/or an intermediate compromise that trades lifetime for latency.

In solving the minimum system latency problem, $L_{min}$ is obtained, whereby a further constraint can be provided:

$$L_{min} T - \beta \sum_{i \in N, j \in S_i, c \in C} \hat{q}_{i,j}^{(c)} \geq 0 \quad (15)$$

where the parameter $\beta$ is a real number in the range $0 \leq \beta \leq 1$. This constrained optimization formulation also provides parametric control over whether an embodiment provides for a minimum latency solution ($\beta=1$), a maximum lifetime solution ($\beta=0$), or some intermediate compromise that trades lifetime for latency.

The following performance comparisons assess benefits of the various optimizations, and the results are based on a set of random topologies produced by a random topology generator that randomly picks a specified number of node locations uniformly distributed over a square, bounded region of a two-dimensional plane, then scales the resulting node geometry until the average number of neighbors within distance limit $d_{max}$ of each node achieves some target value $Nbor_{avg}$. In the illustrated embodiments, $d_{max}$ was set to 250 m (based on known 802.11 cutoff characteristics) and $Nbor_{avg}$ was set to 10 (sufficiently high that after scaling the topology graph remained fully connected). The few segmented topologies generated using these parameters were discarded. Further, in constructing these results, all nodes were assumed to begin with the same amount of energy, the energy cost of transmitting between any pair of adjacent nodes is assumed to be the same (consistent with an 802.11 model), and all nodes have identical information generation rates, e.g., $Q_i^{(c)} = Q_0$, $\forall i \in N - D^{(c)}, \forall c \in C$.

Figure 2:
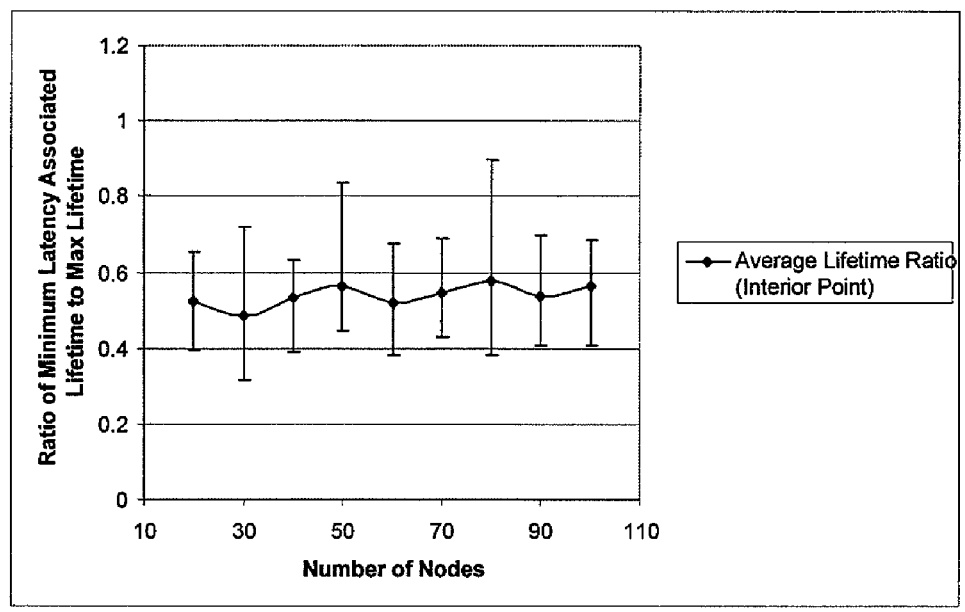
FIG. 2 illustrates ratios of system lifetimes produced by Interior Point-based shortest path optimizations.

In a first comparison of default and optimized system lifetimes, a comparison is performed of the maximum system lifetime achievable for each topology with the nominal system lifetime obtained by solving the minimum system latency problem without considering system lifetime. This initial comparison provides a sense for the typical level of improvement that might be expected in system lifetime using lifetime maximization over the lifetime produced by solving the minimum system latency problem with no lifetime constraints. For this experiment, the number of nodes in the topology varied between 20 and 100 in increments of 10, using 10 random topologies at each increment. For each topology, the associated system lifetime produced by solving the system latency minimum problem was divided by the maximum achievable system lifetime for that topology obtained by solving the system lifetime maximization problem. FIGS. 1 and 2 present solutions provided by two methods for solving Linear Programming problems, namely Simplex and Interior Point. Accordingly, FIG. 1 shows ratios of system lifetimes produced by Simplex-based shortest path optimizations to the maximum achievable system lifetimes for a set of random topologies, while FIG. 2 illustrates ratios of system lifetimes produced by Interior Point-based shortest path optimizations to the maximum achievable system lifetimes for a set of random topologies. The curves in FIGS. 1 and 2 show the average ratio over a set of ten trials for each number-of-nodes setting, with the maximum and minimum ratio values for the ten trials shown as error bars about the average.

With respect to FIGS. 1 and 2, on average, the nominal solutions to the minimum system latency problem (produced by either the simplex or the interior point techniques) yield a system lifetime that is about half of that achievable using an explicit system lifetime maximization approach. A related observation is that the resulting system lifetime produced by solving the minimum system latency problem varies considerably based on the specific topology, ranging from a low of nearly 25% of the maximum possible lifetime to a high of nearly 90% of the maximum achievable lifetime. Further, in general the, interior point technique appears to perform slightly better, although not consistently better upon close examination of the individual data points.

Figure 3:
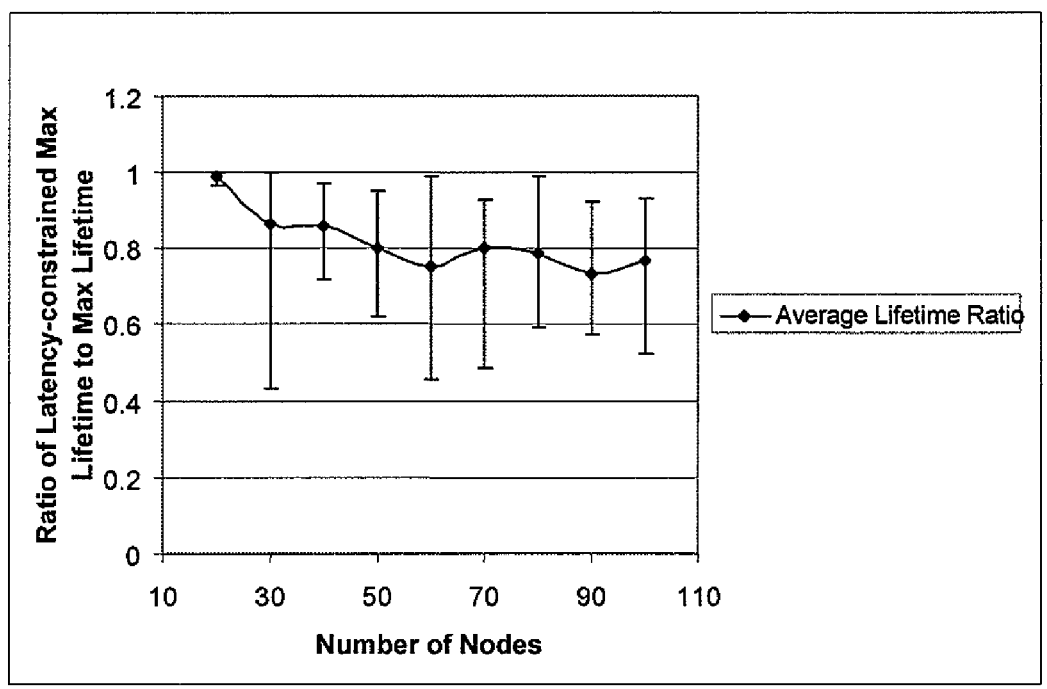
FIG. 3 illustrates ratios of system lifetimes produced by solving a latency-constrained maximum system lifetime problem to maximum achievable system lifetimes for a set of random topologies, where error bars show the sensitivity of the solutions to individual topologies.
Figure 4:
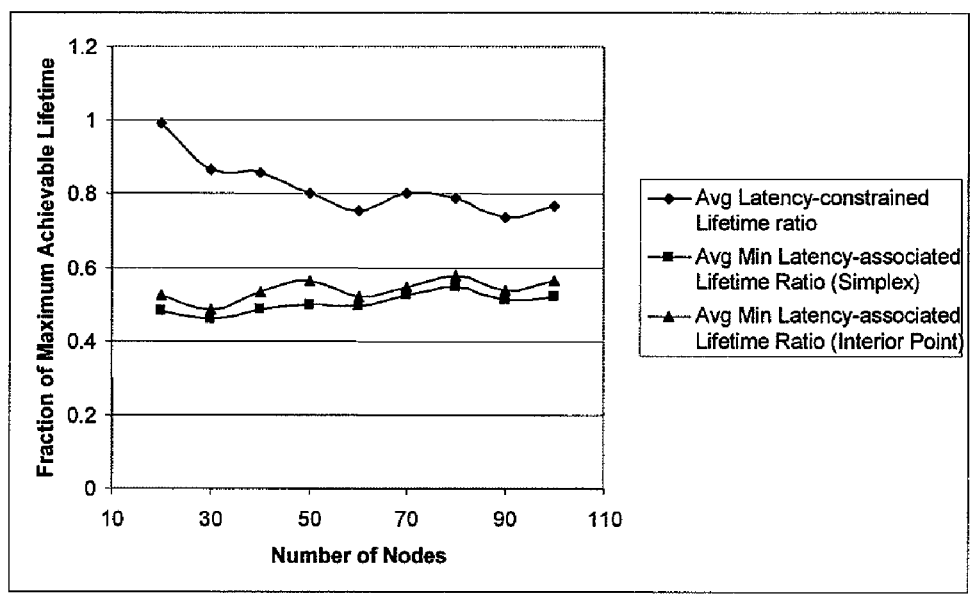
FIG. 4 shows a comparison of lifetimes produced by solving the minimum system latency problem (both simplex and interior point methods) with the lifetime produced by the solution to the latency constrained maximum lifetime problem.

A further experiment compared the maximum system lifetime achievable for each topology with the system lifetime obtained from solving the latency-constrained system lifetime maximization problem. The results shown in FIG. 3 for $\beta=1$ (e.g., the problem is constrained to produce the minimum system latency possible) demonstrate a marked improvement in average system lifetime, indicating an approximate 50% increase in system lifetime; however, the actual fraction of the maximum system lifetime achieved for a specific topology can vary greatly, ranging from a low of nearly 40% to a high of 100% (e.g., solutions are possible that simultaneously yield the maximum system lifetime and the minimum system latency). Additionally, it can be observed that the simplex method and the interior point method will produce the same system lifetime and system latency results for the latency-constrained maximum system lifetime problem, although the solution vectors will in general not be the same. The results for the two experiments are shown together on the same graph in FIG. 4.

Also performed was a comparison of the minimum system latency achievable for each topology with the nominal system latency obtained by solving the maximum system lifetime problem without considering system latency. This initial comparison provides a sense for the typical level of improvement that might be expected in system latency using latency minimization techniques over the latency produced by solving the maximum system lifetime problem with no latency constraints. In this comparison, the number of nodes in the topology varied from 20 to 100 in increments of 10, using 10 random topologies at each increment. For each topology, the associated system latency produced by solving the system lifetime maximization problem was divided by the minimum achievable system latency for that topology obtained by solving the system latency minimization problem. The results are shown in FIG. 5 for solutions obtained using a Simplex-based problem solver, and in FIG. 6 for solutions produced by an Interior Point-based problem solver.

Figure 5:
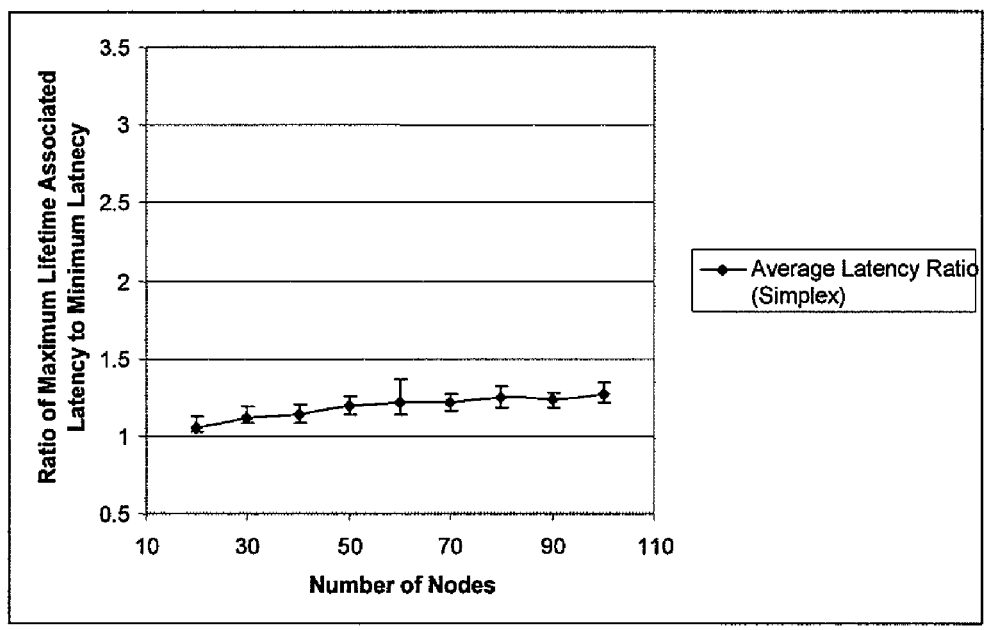
FIG. 5 shows ratios of system latencies produced by Simplex-based maximum lifetime optimizations to the minimum achievable system latencies for a set of random topologies, with the curve showing the average ratio over a set of ten trials for each number-of-nodes setting, and with the maximum and minimum ratio values for the ten trials shown as error bars about the average.
Figure 6:
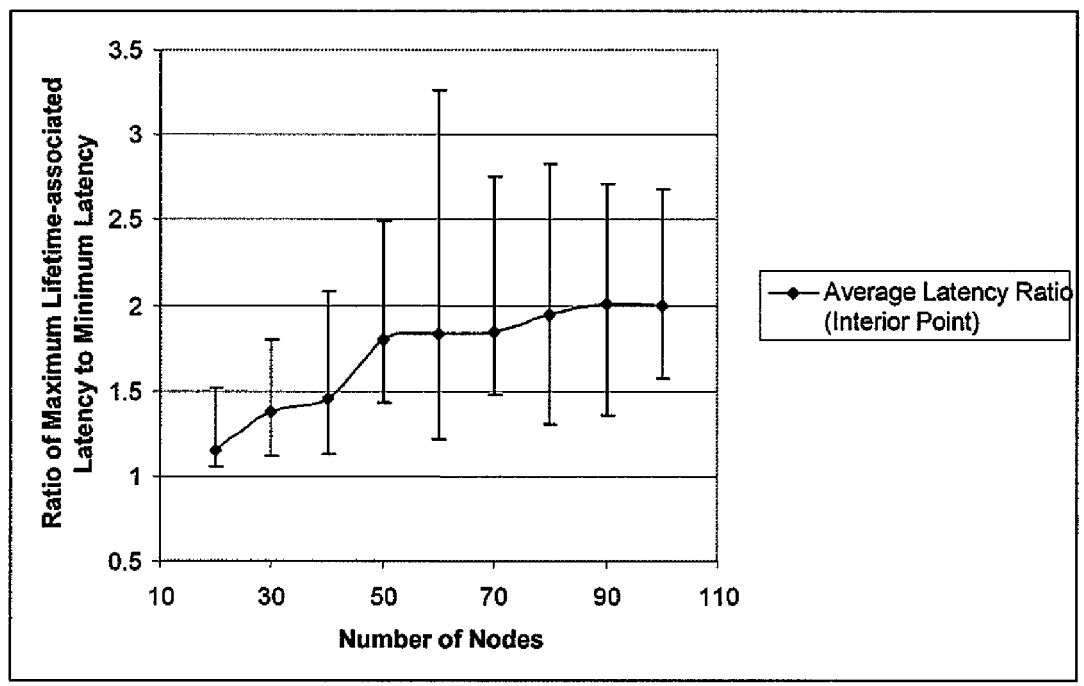
FIG. 6 illustrates ratios of system latencies produced by Interior Point-based maximum lifetime optimizations to the minimum achievable system latencies for a set of random topologies, with the curve showing the average ratio over a set of ten trials for each number-of-nodes setting, and with the maximum and minimum ratio values for the ten trials shown as error bars about the average.

A review of FIGS. 5 and 6 indicates that the simplex solver provides better results in that the system latencies are considerably smaller and there is less variation in the actual results (e.g., the latencies resulting from solving the lifetime maximization problem using the simplex solver are less random). Because the interior point method can produce system latencies that are, on average, twice as much as the minimum achievable system latency, and in some cases more that three times as much, FIGS. 5 and 6 are indicative of performing both lifetime and latency optimizations, since lifetime or latency optimization alone can produce degraded performance in the other measure. Accordingly, simply calculating routes that provide maximal system lifetime does not necessarily provide a good routing solution from a network latency perspective, and further, a solution which minimizes system latency under system lifetime constraints can provide significantly improved performance.

Figure 7:
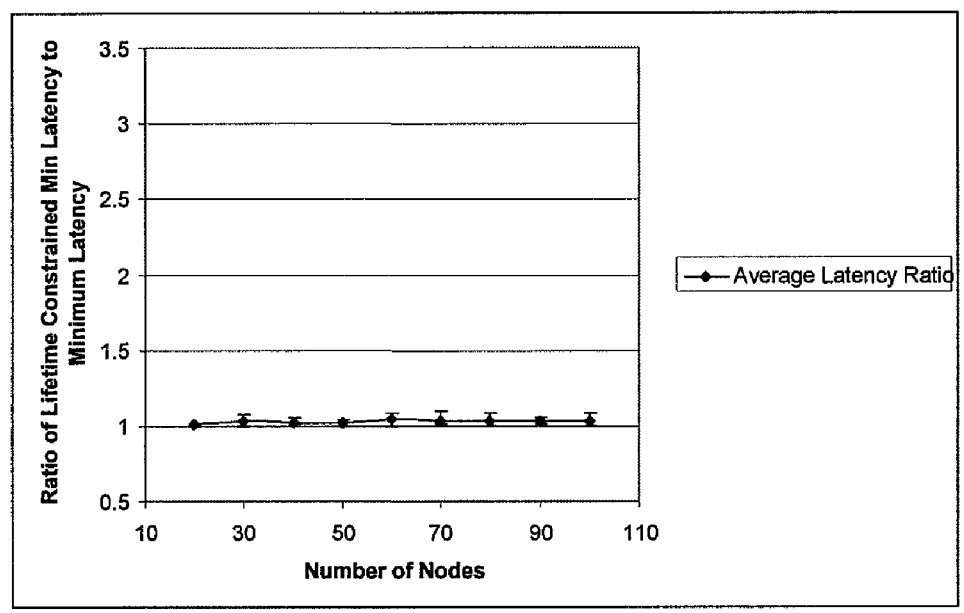
FIG. 7 shows ratios of system latencies produced by solving the lifetime-constrained minimum system latency problem to the minimum achievable system latencies for a set of random topologies, where error bars show the sensitivity of the solutions to individual topologies.
Figure 8:
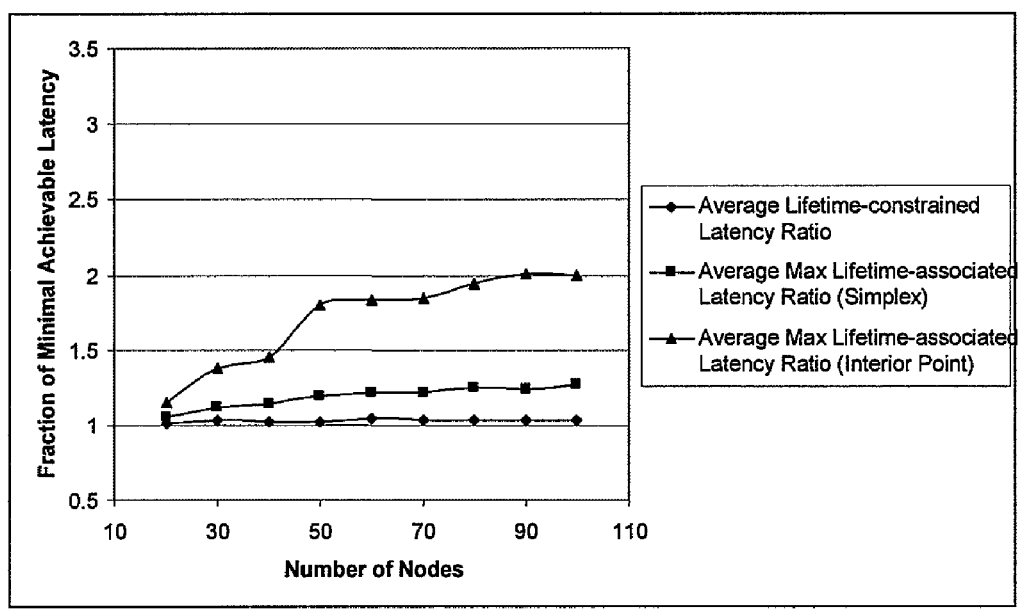
FIG. 8 demonstrates a comparison of latencies produced by solving the maximum system lifetime problem (both simplex and interior point methods) with the latency produced by the solution to the lifetime constrained minimum latency problem.

To emphasize this latter statement, a further experiment included comparing the minimum system latency achievable for each topology with the system latency obtained as a result of solving the lifetime-constrained system latency minimization problem. FIG. 7 illustrates the results for $\alpha=1$ (e.g., the problem is constrained to produce the maximum system lifetime possible) and demonstrates that the addition of the secondary latency optimization allows a maximum lifetime routing configuration to realize system latencies that are only marginally greater than the minimum possible system latency as the average increase for these experiments was less than 3%. Unlike the lifetime evaluation experiments, however, the actual fraction of the minimum system latency achieved for a specific topology varies very little, ranging from a low of 0% (e.g., some topologies admitted routing configurations where the minimum latency and the maximum lifetime can be achieved simultaneously) to a high of less than 10%. For comparison, the results for the previous two experiments are shown together on the same graph in FIG. 8 to demonstrate the differences between the maximum lifetime solutions which ignore latency issues, and lifetime constrained minimum latency solutions.

Using the lifetime-constrained minimum latency formulation, an operating characteristic curve can be constructed for a given network topology by varying $\alpha$ between 0 and 1. The resulting curve expresses the optimal trade between achievable system latency and system lifetime.

Figure 9:
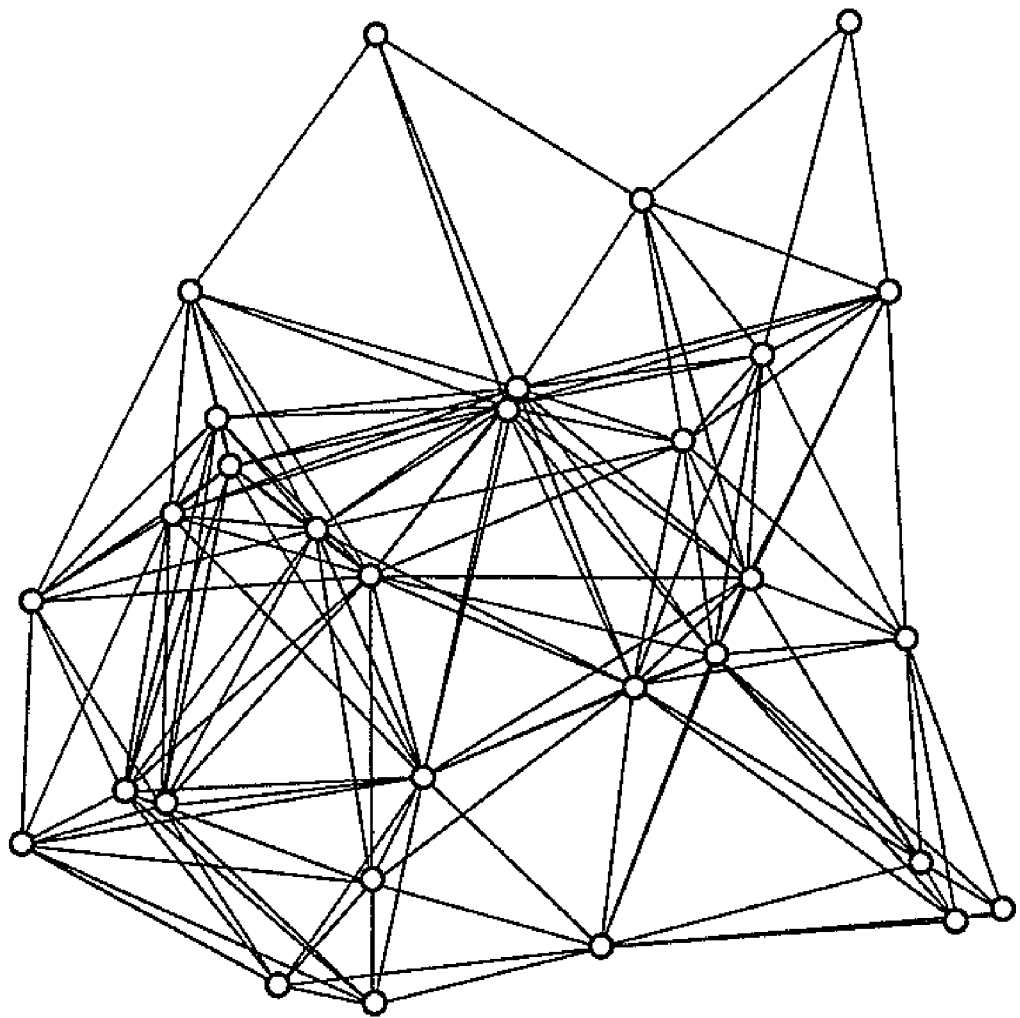
FIG. 9 illustrates an example 30-node network topology.
Figure 10:
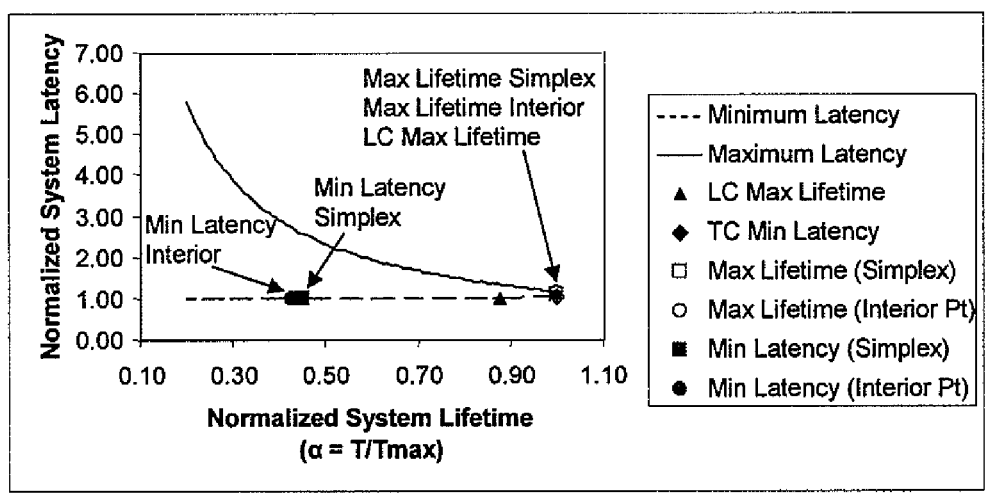
FIG. 10 illustrates a comparison of different results for the network of FIG. 9.

An example of this type of trade analysis for a 30 node topology (e.g., FIG. 9) is shown in FIG. 10. It can be understood that the 30 node topology selected corresponds to the topology of the set of ten 30-node topologies that yielded performance values closest to the "average" performance curves. In FIG. 10, system latency L is normalized by dividing by the minimum achievable latency $L_{min}$, such that a normalized system latency value of one represents a maximum system lifetime routing configuration, with suboptimal latency characteristics (from a system latency perspective) having normalized system latencies greater than one. Similarly, the system lifetime T is normalized by the maximum achievable system lifetime $T_{max}$, such that a normalized system lifetime value of one represents a maximum system lifetime routing configuration, with suboptimal configurations (from a system lifetime perspective) having normalized system lifetimes less than one. Normalized in this fashion, the normalized system lifetime is identically $\alpha$.

For comparison purposes, also shown in FIG. 10 are the maximum lifetime and minimum latency points produced by both the simplex and interior point methods for this topology, and the lifetime constrained latency minimized point for $\alpha=1$ (marked as TC Min Latency), and the latency constrained lifetime maximized point for $\beta=1$ (marked as LC Max Lifetime). These two latter points must lie along the optimal lifetime-latency characteristic curve, and represent the bounding points between which a solution must lie that attempts to optimize both parameters.

Figure 11:
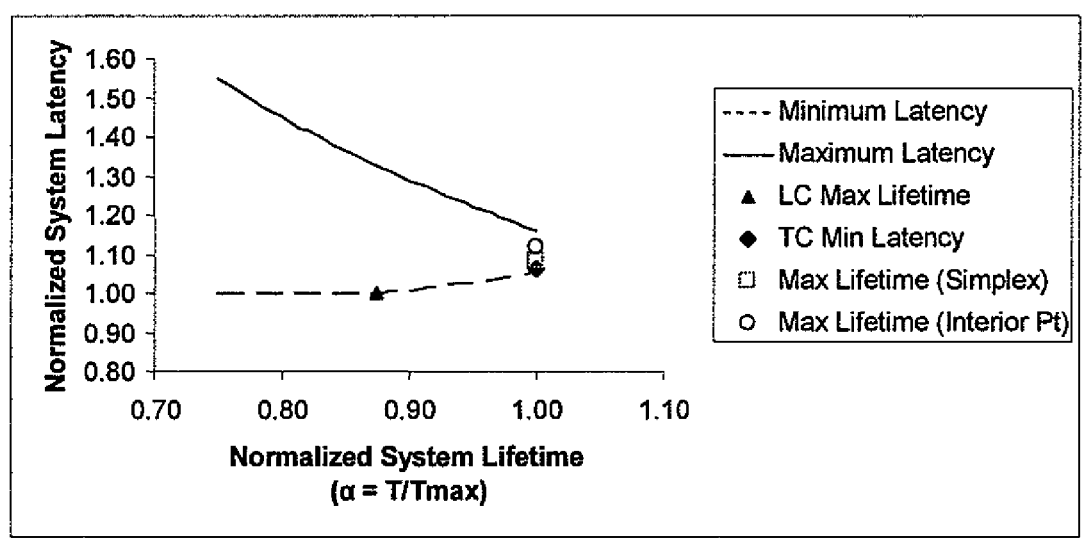
FIG. 11 shows a magnified portion of FIG. 10.

FIG. 10 also shows a curve describing the maximum system latency that is possible for a given system lifetime value, which is obtained by requiring the Linear Programming solver to maximize rather than minimize the system latency objective function. From this information, it can be shown that in the absence of latency optimization, the maximum lifetime solution (e.g., the solution for $\alpha=1$, with a normalized lifetime of 1.0) can yield system latencies between the two curves. FIG. 10 thus allows for a visualization of the system latency obtained by solving the maximum lifetime problem in isolation relative to the best latency achievable. As FIG. 10 demonstrates, the disclosed approach which minimizes system latency under system lifetime constraints provides improved performance when compared to other techniques. FIG. 11 shows a magnified view of FIG. 10 about the vicinity of the optimal trade portions of the characteristic curve in FIG. 11.

Figure 13:
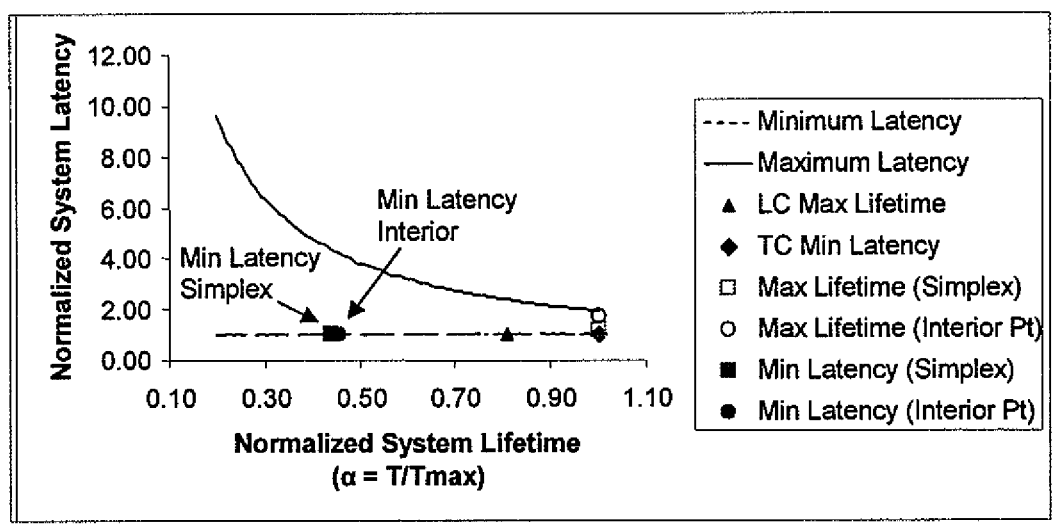
FIG. 13 shows operating curves for the 50 node network topology of FIG. 12.
Figure 14:
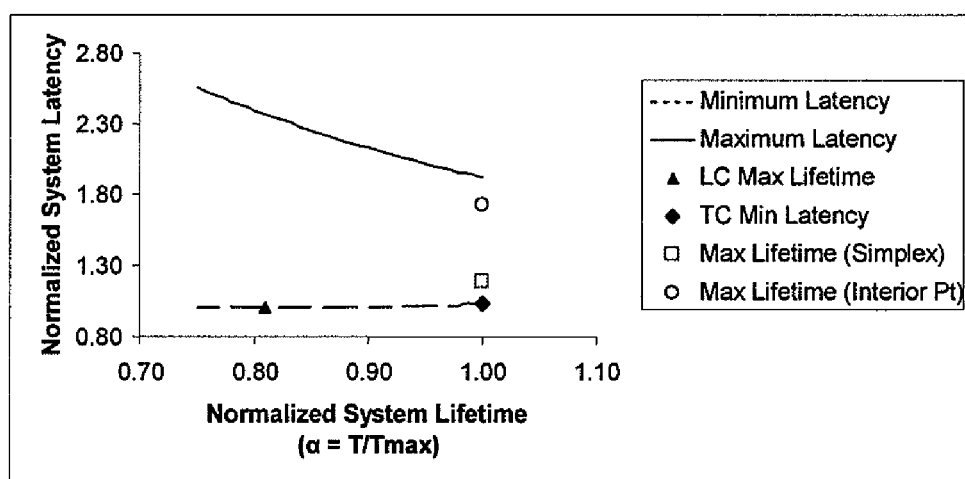
FIG. 14 shows a magnified portion of FIG. 13.
Figure 15:
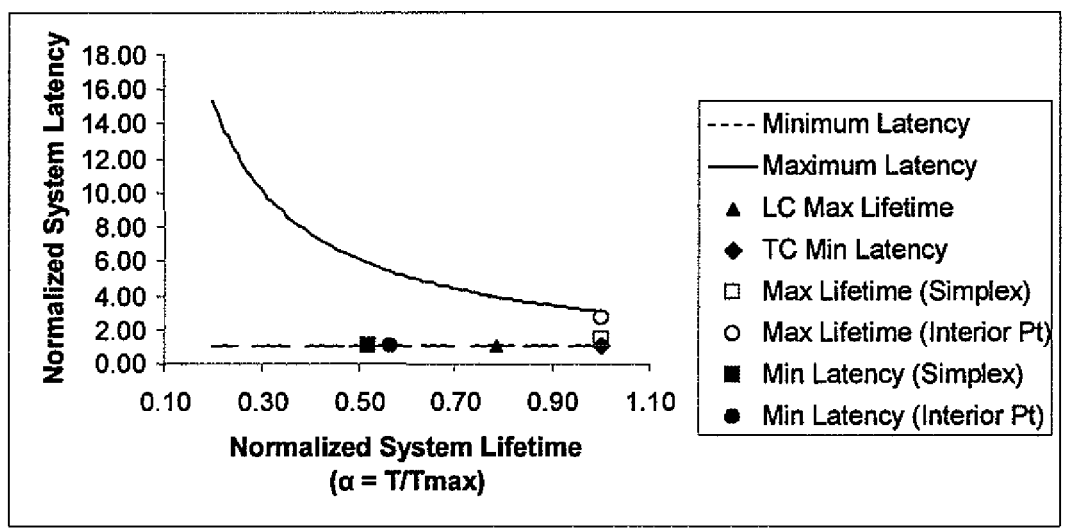
FIG. 15 shows operating curves for the 100 node network topology of FIG. 12.
Figure 16:
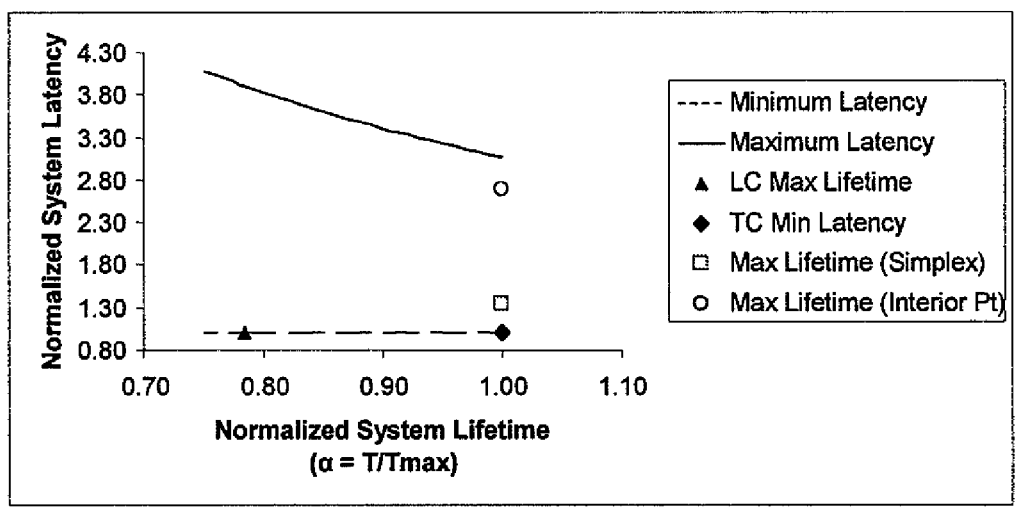
FIG. 16 shows a magnified portion of FIG. 15.

Although the differences in latency between the worst and the best set of routes for a maximum lifetime operating point (normalized lifetime of one) are only about 10% for the FIG. 9 network, the differences become more pronounced as the network increases in size. To illustrate this, FIGS. 13 and 15 show operating curves for the example 50 and 100 node topologies, respectively, of FIG. 12. From FIGS. 13 and 15, it can be recognized that the difference increased to 50% for the 50 node topology, and increases further to two and one-half times the minimal achievable latency for the 100 node topology. FIGS. 14 and 16 provide magnified views of FIGS. 13 and 15, respectively. Table 1 shows a portion of the routing table produced by solving the lifetime constrained minimum latency problem for the 100 node topology of FIG. 12, and it can be noted that there are not any multipath routes.

From FIGS. 13-16, it can be observed that although multipath solutions are allowable and can emerge from the LP problem solvers, in general, such solutions are not produced. An example of this phenomenon is presented in Table 2, which shows the routing table produced by the lifetime-constrained minimum latency problem solution for the 100 node example of FIG. 12. This implies that the solutions are sensitive to the load assumptions, as can be seen from the following examples.

Figure 17:
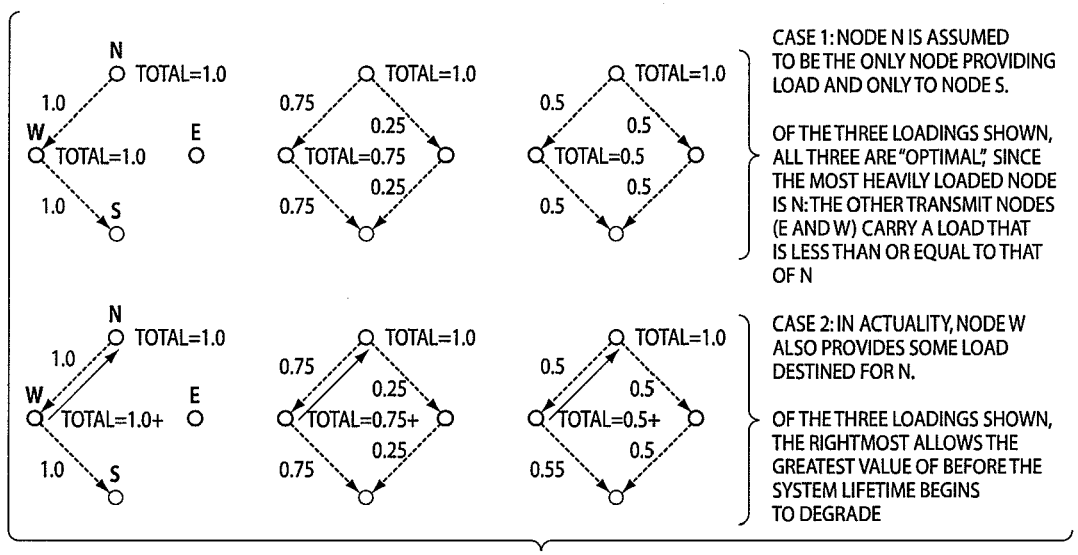
FIG. 17 shows an example four node network where the use of balance multipath provides a solution with increased robustness to differences between assumed and actual traffic loads.

As a first example, consider a four node network with nodes labeled N (North), S (South), E (East), and W (West) as shown in FIG. 17. In the upper row, the assumed load is that of a unit of traffic from N to S. Here, all three configurations are "optimal" since node N must carry the maximum load of one, with the loads on both E and W necessarily being less than or equal to N's load level (note that all latencies are also equal). In the lower row, it is then revealed that node W must also send some smaller amount of load $\epsilon$ to N. Accordingly, the rightmost configuration allows the greatest variation in the actual value of $\epsilon$ before the system lifetime begins to degrade. Hence, configurations that balance load distributions across multiple pathways are more robust to differences between actual and assumed network loads.

Figure 18:
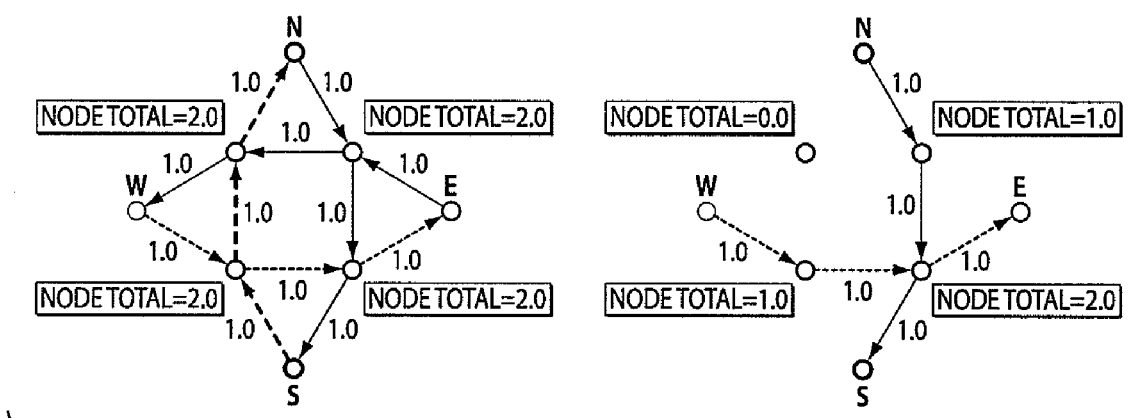
FIG. 18 illustrates an example arrangement of an eight-node network topology.

FIG. 18 demonstrates another example arrangement of an eight node network. For this example, the four outermost nodes labeled N, S, E, and W act as both senders and receivers, and the four interior nodes act only as routers. It is also assumed that the traffic model is one where each of the exterior nodes must send a unit of traffic to its opposite corner: e.g., N sends to S, S to N, E to W, and W to E. Under this assumption, an optimal routing configuration constructed from only unipath routes is shown on the left of FIG. 18, where all router nodes carry identical loads.

TABLE 1

| Current | Dest | No. Paths | NextHop | Weight |
|---|---|---|---|---|
| 0 | 1 | 1 | 22 | 1 |
| 0 | 2 | 1 | 27 | 1 |
| 0 | 3 | 1 | 27 | 1 |
| 0 | 4 | 1 | 28 | 1 |
| 0 | 5 | 1 | 27 | 1 |
| 0 | 6 | 1 | 93 | 1 |
| 0 | 7 | 1 | 91 | 1 |
| 0 | 8 | 1 | 91 | 1 |
| 0 | 9 | 1 | 42 | 1 |
| 0 | 10 | 1 | 22 | 1 |
| 0 | 11 | 1 | 28 | 1 |
| 0 | 12 | 1 | 42 | 1 |
| 0 | 13 | 1 | 42 | 1 |
| 0 | 14 | 1 | 42 | 1 |
| 0 | 15 | 1 | 42 | 1 |
| 0 | 16 | 1 | 16 | 1 |
| 0 | 17 | 1 | 27 | 1 |
| 0 | 18 | 1 | 27 | 1 |
| 0 | 19 | 1 | 91 | 1 |
| 0 | 20 | 1 | 20 | 1 |
| 0 | 21 | 1 | 21 | 1 |
| 0 | 22 | 1 | 22 | 1 |
| 0 | 23 | 1 | 91 | 1 |
| 0 | 24 | 1 | 42 | 1 |
| 0 | 25 | 1 | 91 | 1 |
| 0 | 26 | 1 | 22 | 1 |
| 0 | 27 | 1 | 27 | 1 |
| 0 | 28 | 1 | 28 | 1 |
| 0 | 29 | 1 | 85 | 1 |
| 0 | 30 | 1 | 42 | 1 |
| 0 | 31 | 1 | 42 | 1 |
| 0 | 32 | 1 | 22 | 1 |
| 0 | 33 | 1 | 33 | 1 |
| 0 | 34 | 1 | 91 | 1 |
| 0 | 35 | 1 | 42 | 1 |
| 0 | 36 | 1 | 91 | 1 |
| 0 | 37 | 1 | 91 | 1 |
| 0 | 38 | 1 | 42 | 1 |
| 0 | 39 | 1 | 42 | 1 |
| 0 | 40 | 1 | 85 | 1 |
| 0 | 41 | 1 | 91 | 1 |
| 0 | 42 | 1 | 42 | 1 |
| 0 | 43 | 1 | 91 | 1 |
| 0 | 44 | 1 | 42 | 1 |
| 0 | 45 | 1 | 91 | 1 |
| 0 | 46 | 1 | 42 | 1 |
| 0 | 47 | 1 | 22 | 1 |
| 0 | 48 | 1 | 42 | 1 |
| 0 | 49 | 1 | 91 | 1 |
| 0 | 50 | 1 | 42 | 1 |
| 0 | 51 | 1 | 42 | 1 |
| 0 | 52 | 1 | 91 | 1 |
| 0 | 53 | 1 | 91 | 1 |
| 0 | 54 | 1 | 42 | 1 |
| 0 | 55 | 1 | 91 | 1 |
| 0 | 56 | 1 | 91 | 1 |
| 0 | 57 | 1 | 27 | 1 |
| 0 | 58 | 1 | 91 | 1 |
| 0 | 59 | 1 | 42 | 1 |
| 0 | 60 | 1 | 27 | 1 |
| 0 | 61 | 1 | 91 | 1 |
| 0 | 62 | 1 | 42 | 1 |
| 0 | 63 | 1 | 22 | 1 |
| 0 | 64 | 1 | 27 | 1 |
| 0 | 65 | 1 | 28 | 1 |
| 0 | 66 | 1 | 91 | 1 |
| 0 | 67 | 1 | 20 | 1 |
| 0 | 68 | 1 | 28 | 1 |
| 0 | 69 | 1 | 85 | 1 |
| 0 | 70 | 1 | 28 | 1 |
| 0 | 71 | 1 | 85 | 1 |
| 0 | 72 | 1 | 91 | 1 |
| 0 | 73 | 1 | 42 | 1 |
| 0 | 74 | 1 | 85 | 1 |

TABLE 1-continued

| Current | Dest | No. Paths | NextHop | Weight |
|---|---|---|---|---|
| 0 | 75 | 1 | 89 | 1 |
| 0 | 76 | 1 | 28 | 1 |
| 0 | 77 | 1 | 91 | 1 |
| 0 | 78 | 1 | 91 | 1 |
| 0 | 79 | 1 | 42 | 1 |
| 0 | 80 | 1 | 22 | 1 |
| 0 | 81 | 1 | 22 | 1 |
| 0 | 82 | 1 | 85 | 1 |
| 0 | 83 | 1 | 91 | 1 |
| 0 | 84 | 1 | 42 | 1 |
| 0 | 85 | 1 | 85 | 1 |
| 0 | 86 | 1 | 85 | 1 |
| 0 | 87 | 1 | 22 | 1 |
| 0 | 88 | 1 | 85 | 1 |
| 0 | 89 | 1 | 89 | 1 |
| 0 | 90 | 1 | 42 | 1 |
| 0 | 91 | 1 | 91 | 1 |
| 0 | 92 | 1 | 22 | 1 |
| 0 | 93 | 1 | 93 | 1 |
| 0 | 94 | 1 | 42 | 1 |
| 0 | 95 | 1 | 91 | 1 |
| 0 | 96 | 1 | 42 | 1 |
| 0 | 97 | 1 | 91 | 1 |
| 0 | 98 | 1 | 42 | 1 |
| 0 | 99 | 1 | 85 | 1 |
| 1 | 0 | 1 | 26 | 1 |
| 1 | 2 | 1 | 63 | 1 |
| 1 | 3 | 1 | 63 | 1 |
| 1 | 4 | 1 | 26 | 1 |
| 1 | 5 | 1 | 63 | 1 |
| 1 | 6 | 1 | 86 | 1 |
| 1 | 7 | 1 | 63 | 1 |
| 1 | 8 | 1 | 63 | 1 |
| 1 | 9 | 1 | 63 | 1 |
| 1 | 10 | 1 | 26 | 1 |
| 1 | 11 | 1 | 26 | 1 |
| 1 | 12 | 1 | 26 | 1 |
| 1 | 13 | 1 | 63 | 1 |
| 1 | 14 | 1 | 26 | 1 |
| 1 | 15 | 1 | 63 | 1 |
| 1 | 16 | 1 | 26 | 1 |
| 1 | 17 | 1 | 63 | 1 |
| 1 | 18 | 1 | 26 | 1 |
| 1 | 19 | 1 | 63 | 1 |
| 1 | 20 | 1 | 26 | 1 |
| 1 | 21 | 1 | 26 | 1 |
| 1 | 22 | 1 | 26 | 1 |
| 1 | 23 | 1 | 63 | 1 |
| 1 | 24 | 1 | 63 | 1 |
| 1 | 25 | 1 | 63 | 1 |
| 1 | 26 | 1 | 26 | 1 |
| 1 | 27 | 1 | 26 | 1 |
| 1 | 28 | 1 | 26 | 1 |
| 1 | 29 | 1 | 63 | 1 |
| 1 | 30 | 1 | 63 | 1 |
| 1 | 31 | 1 | 63 | 1 |
| 1 | 32 | 1 | 26 | 1 |
| 1 | 33 | 1 | 26 | 1 |
| 1 | 34 | 1 | 63 | 1 |
| 1 | 35 | 1 | 26 | 1 |
| 1 | 36 | 1 | 63 | 1 |
| 1 | 37 | 1 | 63 | 1 |
| 1 | 38 | 1 | 26 | 1 |
| 1 | 39 | 1 | 63 | 1 |
| 1 | 40 | 1 | 63 | 1 |
| 1 | 41 | 1 | 63 | 1 |
| 1 | 42 | 1 | 26 | 1 |
| 1 | 43 | 1 | 63 | 1 |
| 1 | 44 | 1 | 26 | 1 |
| 1 | 45 | 1 | 63 | 1 |
| 1 | 46 | 1 | 26 | 1 |
| 1 | 47 | 1 | 26 | 1 |
| 1 | 48 | 1 | 26 | 1 |
| 1 | 49 | 1 | 26 | 1 |
| 1 | 50 | 1 | 26 | 1 |
| 1 | 51 | 1 | 63 | 1 |
| 1 | 52 | 1 | 26 | 1 |
| 1 | 53 | 1 | 63 | 1 |
| 1 | 54 | 1 | 26 | 1 |
| 1 | 55 | 1 | 63 | 1 |
| 1 | 56 | 1 | 63 | 1 |
| 1 | 57 | 1 | 26 | 1 |
| 1 | 58 | 1 | 63 | 1 |
| 1 | 59 | 1 | 63 | 1 |
| 1 | 60 | 1 | 63 | 1 |
| 1 | 61 | 1 | 63 | 1 |
| 1 | 62 | 1 | 63 | 1 |
| 1 | 63 | 1 | 63 | 1 |
| 1 | 64 | 1 | 63 | 1 |
| 1 | 65 | 1 | 26 | 1 |
| 1 | 66 | 1 | 26 | 1 |
| 1 | 67 | 1 | 26 | 1 |
| 1 | 68 | 1 | 26 | 1 |
| 1 | 69 | 1 | 26 | 1 |
| 1 | 70 | 1 | 26 | 1 |
| 1 | 71 | 1 | 71 | 1 |
| 1 | 72 | 1 | 63 | 1 |
| 1 | 73 | 1 | 63 | 1 |
| 1 | 74 | 1 | 26 | 1 |
| 1 | 75 | 1 | 26 | 1 |
| 1 | 76 | 1 | 26 | 1 |
| 1 | 77 | 1 | 63 | 1 |
| 1 | 78 | 1 | 63 | 1 |
| 1 | 79 | 1 | 63 | 1 |
| 1 | 80 | 1 | 26 | 1 |
| 1 | 81 | 1 | 26 | 1 |
| 1 | 82 | 1 | 26 | 1 |
| 1 | 83 | 1 | 63 | 1 |
| 1 | 84 | 1 | 63 | 1 |
| 1 | 85 | 1 | 26 | 1 |
| 1 | 86 | 1 | 86 | 1 |
| 1 | 87 | 1 | 26 | 1 |
| 1 | 88 | 1 | 63 | 1 |
| 1 | 89 | 1 | 26 | 1 |
| 1 | 90 | 1 | 63 | 1 |
| 1 | 91 | 1 | 26 | 1 |
| 1 | 92 | 1 | 26 | 1 |
| 1 | 93 | 1 | 26 | 1 |
| 1 | 94 | 1 | 63 | 1 |
| 1 | 95 | 1 | 63 | 1 |
| 1 | 96 | 1 | 63 | 1 |
| 1 | 97 | 1 | 63 | 1 |
| 1 | 98 | 1 | 26 | 1 |
| 1 | 99 | 1 | 99 | 1 |
| 2 | 0 | 1 | 79 | 1 |
| 2 | 1 | 1 | 3 | 1 |
| 2 | 3 | 1 | 3 | 1 |
| 2 | 4 | 1 | 3 | 1 |
| 2 | 5 | 1 | 58 | 1 |
| 2 | 6 | 1 | 3 | 1 |
| 2 | 7 | 1 | 7 | 1 |
| 2 | 8 | 1 | 3 | 1 |
| 2 | 9 | 1 | 79 | 1 |
| 2 | 10 | 1 | 78 | 1 |
| 2 | 11 | 1 | 3 | 1 |
| 2 | 12 | 1 | 7 | 1 |
| 2 | 13 | 1 | 7 | 1 |
| 2 | 14 | 1 | 79 | 1 |
| 2 | 15 | 1 | 79 | 1 |
| 2 | 16 | 1 | 79 | 1 |
| 2 | 17 | 1 | 79 | 1 |
| 2 | 18 | 1 | 78 | 1 |

With this routing configuration, removing any one of traffic flows (e.g., N-to-S), and three of the traffic flows, or any pair of crossing flows (e.g., S-to-N and E-to-W as shown on the right side of FIG. 18) leaves the loading of the router nodes in an unbalanced state. Removing loads does not decrease the network lifetime (e.g., the maximum load on any router node is still 2 on the right side of FIG. 18).

Figure 19:
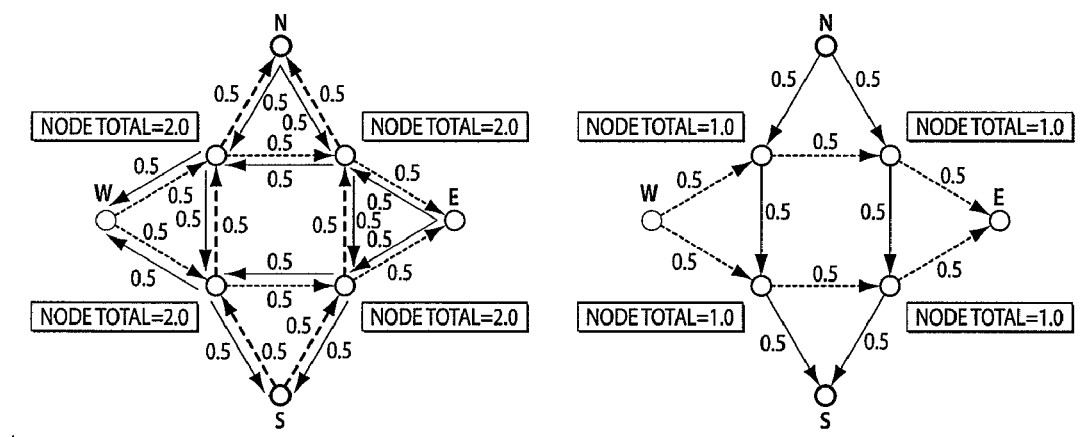
FIG. 19 demonstrates the FIG. 18 network with multipath routing.

FIG. 19 shows a repeat of this example requiring the use of multipath routing as part of constructing the optimal routing configuration. With this added requirement, the total node loading is identical to the unipath case, and the routing configuration is also optimal; however, the right side of FIG. 19 indicates that the removal of the S-to-N and E-to-W flows leaves the loads at the router nodes in a balanced state. Removal of any single flow, pair of flows, and/or three flows in this example leaves the load on the router nodes in a balanced state. The net consequence of using multipath routing in this example is that reducing or removing flows improves the lifetime of the network in a uniform way. Conversely, increasing the load associated with one, two, or three of the flows provides graceful degradation of the network lifetime, with network lifetime degrading at roughly half the rate of the unipath configuration in FIG. 18.

Including the system latency as an additional constraint on the lifetime constrained minimum system latency problem, governed by the parameter $\beta$, to form the Lifetime and Latency Constrained Maximal Path Diversity Problem (henceforth described as Optimal PALMS), reduces to:

$$\text{Minimize} \sum_{c \in C} (\hat{q}_{i,j}^{(c)})^2 \quad (16)$$

such that $$\hat{q}_{i,j}^{(c)} \geq 0, \quad \forall i \in N, \forall j \in S_i, \quad (16A)$$
$$\forall c \in C$$

$$\sum_{j \in S_i} e_{i,j} \sum_{c \in C} \hat{q}_{i,j}^{(c)} \leq E_i, \quad \forall i \in N, \quad (16B)$$

-continued $$TB_i - \sum_{c \in C} \sum_{j:i \in S_j} \hat{q}_{j,i}^{(c)} - \sum_{c \in C} \sum_{k \in S_i} \hat{q}_{i,k}^{(c)} \geq 0 \quad \forall i \in N \quad (16C)$$

$$\sum_{j:i \in S_j} \hat{q}_{j,i}^{(c)} + TQ_i^{(c)} = \sum_{k \in S_i} \hat{q}_{i,k}^{(c)}, \quad \begin{array}{l} \forall i \in N - D^{(c)}, \\ \forall c \in C \end{array} \quad (16D)$$

$$T \geq \alpha T_{\max} \quad (16E)$$

$$\beta \sum_{i \in N, j \in S_i, c \in C} \hat{q}_{i,j}^{(c)} \leq L(\alpha, T_{\max}) \quad (16F)$$

where $L(\alpha, T_{max})$ describes the minimum achievable system latency under the constraint $T \geq \alpha T_{max}$.

A procedure for constructing the solution to this problem is to first solve the maximum lifetime problem to determine $T_{max}$, then solve the lifetime-constrained minimum latency problem for a given $\alpha$ and $T_{max}$ to determine $L(\alpha, T_{max})$. Further, solve the optimal PALMS quadratic programming problem of Equation 16 for a given set of $\alpha$, $T_{max}$, $\beta$, and $L(\alpha, T_{max})$ values.

Figure 12:
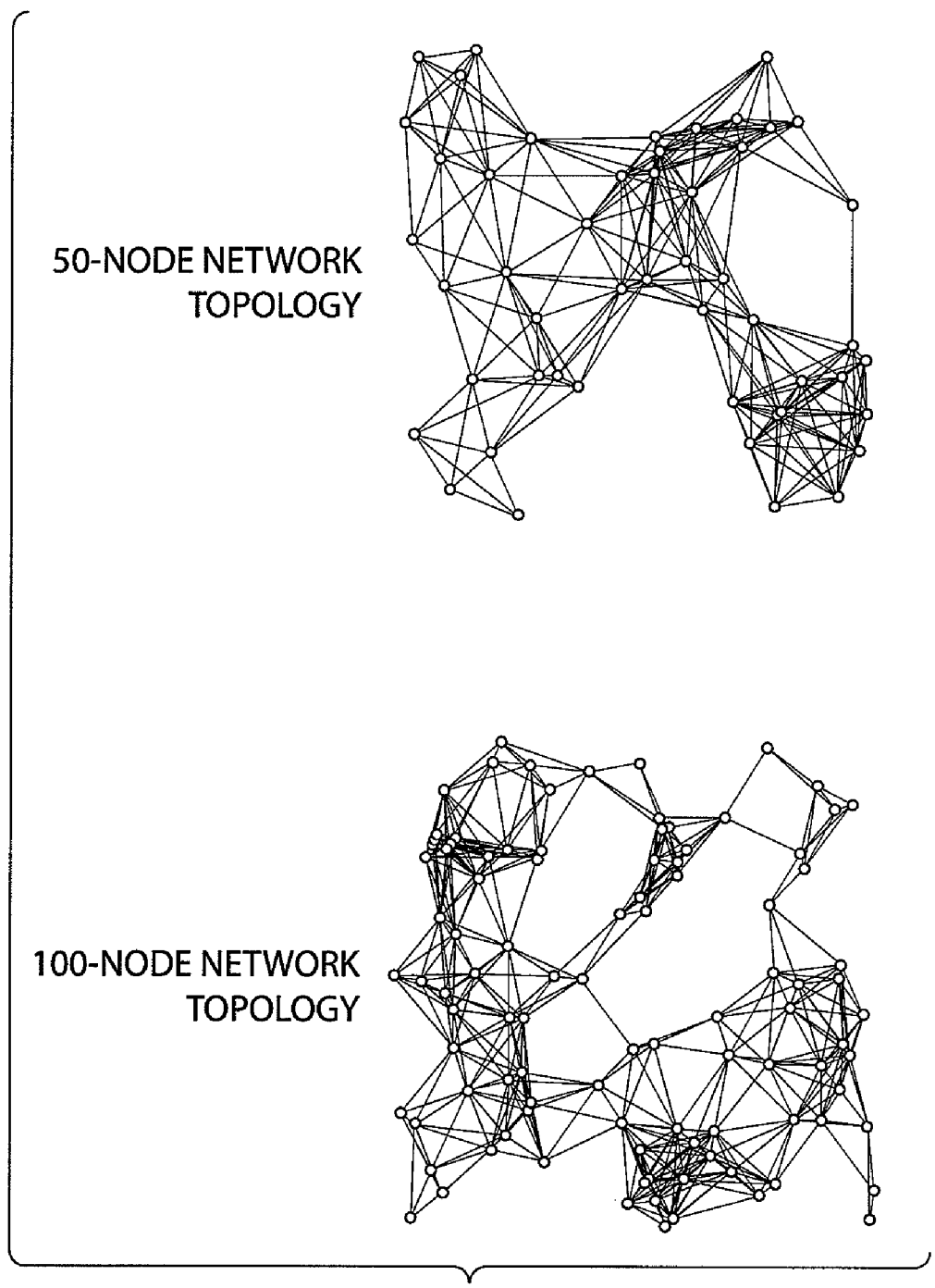
FIG. 12 illustrates example 50 and 100 node network topologies.

Table 3 shows a portion of the multipath routing table constructed by this procedure for the example 100 node topology of FIG. 12. When compared to Table 2 that contains only unipath routes (both $\alpha$ and $\beta$ are set to 1.0, such that both routing tables have identical system lifetimes and system latency values), the only difference between the two solutions is improved robustness afforded by the intentional use of multipath.

TABLE 2

| Curr | Dest | No. Paths | NextHop | Weight | NextHop | Weight | NextHop | Weight | NextHop | Weight | NextHop | Weight | NextHop | Weight |
|---|---|---|---|---|---|---|---|---|---|---|---|---|---|---|
| 0 | 1 | 3 | 22 | 0.47659 | 28 | 0.374 | 91 | 0.1494 | | | | | | |
| 0 | 2 | 2 | 27 | 0.17308 | 42 | 0.82692 | | | | | | | | |
| 0 | 3 | 4 | 27 | 0.24198 | 42 | 0.44742 | 85 | 0.1553 | 91 | 0.1553 | | | | |
| 0 | 4 | 1 | 28 | 1 | | | | | | | | | | |
| 0 | 5 | 2 | 27 | 0.40163 | 42 | 0.59837 | | | | | | | | |
| 0 | 6 | 2 | 22 | 0.56848 | 28 | 0.43152 | | | | | | | | |
| 0 | 7 | 2 | 27 | 0.17308 | 42 | 0.82692 | | | | | | | | |
| 0 | 8 | 4 | 27 | 0.30739 | 42 | 0.56761 | 85 | 0.08497 | 91 | 0.04003 | | | | |
| 0 | 9 | 2 | 27 | 0.31177 | 42 | 0.68823 | | | | | | | | |
| 0 | 10 | 3 | 22 | 0.47143 | 28 | 0.36942 | 91 | 0.15914 | | | | | | |
| 0 | 11 | 3 | 22 | 0.47143 | 28 | 0.36942 | 91 | 0.15914 | | | | | | |
| 0 | 12 | 2 | 27 | 0.3258 | 42 | 0.6742 | | | | | | | | |
| 0 | 13 | 2 | 27 | 0.17308 | 42 | 0.82692 | | | | | | | | |
| 0 | 14 | 2 | 27 | 0.37249 | 42 | 0.62751 | | | | | | | | |
| 0 | 15 | 2 | 27 | 0.17308 | 42 | 0.82692 | | | | | | | | |
| 0 | 16 | 1 | 16 | 1 | | | | | | | | | | |
| 0 | 17 | 2 | 27 | 0.40216 | 42 | 0.59784 | | | | | | | | |
| 0 | 18 | 3 | 27 | 0.34651 | 42 | 0.62308 | 85 | 0.03041 | | | | | | |
| 0 | 19 | 2 | 27 | 0.17308 | 42 | 0.82692 | | | | | | | | |
| 0 | 20 | 1 | 20 | 1 | | | | | | | | | | |
| 0 | 21 | 1 | 21 | 1 | | | | | | | | | | |
| 0 | 22 | 1 | 22 | 1 | | | | | | | | | | |
| 0 | 23 | 4 | 27 | 0.19444 | 42 | 0.41667 | 85 | 0.19444 | 91 | 0.19444 | | | | |
| 0 | 24 | 2 | 27 | 0.17308 | 42 | 0.82692 | | | | | | | | |
| 0 | 25 | 4 | 27 | 0.29141 | 42 | 0.49845 | 85 | 0.10507 | 91 | 0.10507 | | | | |
| 0 | 26 | 2 | 22 | 0.56848 | 28 | 0.43152 | | | | | | | | |
| 0 | 27 | 1 | 27 | 1 | | | | | | | | | | |
| 0 | 28 | 1 | 28 | 1 | | | | | | | | | | |
| 0 | 29 | 2 | 27 | 0.3312 | 42 | 0.6688 | | | | | | | | |
| 0 | 30 | 2 | 27 | 0.32573 | 42 | 0.67427 | | | | | | | | |
| 0 | 31 | 2 | 27 | 0.17308 | 42 | 0.82692 | | | | | | | | |
| 0 | 32 | 1 | 22 | 1 | | | | | | | | | | |
| 0 | 33 | 1 | 33 | 1 | | | | | | | | | | |
| 0 | 34 | 4 | 27 | 0.27932 | 42 | 0.47566 | 85 | 0.12251 | 91 | 0.12251 | | | | |
| 0 | 35 | 2 | 27 | 0.29994 | 42 | 0.70006 | | | | | | | | |

TABLE 2-continued

| Curr | Dest | No. Paths | NextHop | Weight | NextHop | Weight | NextHop | Weight | NextHop | Weight | NextHop | Weight | NextHop | Weight |
|---|---|---|---|---|---|---|---|---|---|---|---|---|---|---|
| 0 | 36 | 2 | 27 | 0.17308 | 42 | 0.82692 | | | | | | | | |
| 0 | 37 | 2 | 27 | 0.2 | 42 | 0.8 | | | | | | | | |
| 0 | 38 | 2 | 27 | 0.32658 | 42 | 0.67342 | | | | | | | | |
| 0 | 39 | 2 | 27 | 0.17308 | 42 | 0.82692 | | | | | | | | |
| 0 | 40 | 4 | 27 | 0.28106 | 42 | 0.47892 | 85 | 0.12001 | 91 | 0.12001 | | | | |
| 0 | 41 | 2 | 27 | 0.17308 | 42 | 0.82692 | | | | | | | | |
| 0 | 42 | 1 | 42 | 1 | | | | | | | | | | |
| 0 | 43 | 2 | 27 | 0.17308 | 42 | 0.82692 | | | | | | | | |
| 0 | 44 | 2 | 27 | 0.37249 | 42 | 0.62751 | | | | | | | | |
| 0 | 45 | 4 | 27 | 0.27932 | 42 | 0.47566 | 85 | 0.12251 | 91 | 0.12251 | | | | |
| 0 | 46 | 2 | 27 | 0.3486 | 42 | 0.6514 | | | | | | | | |
| 0 | 47 | 3 | 22 | 0.47143 | 28 | 0.36942 | 91 | 0.15914 | | | | | | |
| 0 | 48 | 2 | 27 | 0.40223 | 42 | 0.59777 | | | | | | | | |
| 0 | 49 | 2 | 27 | 0.26389 | 42 | 0.73611 | | | | | | | | |
| 0 | 50 | 2 | 27 | 0.34854 | 42 | 0.65146 | | | | | | | | |
| 0 | 51 | 2 | 27 | 0.3258 | 42 | 0.6742 | | | | | | | | |
| 0 | 52 | 2 | 27 | 0.26389 | 42 | 0.73611 | | | | | | | | |
| 0 | 53 | 4 | 27 | 0.27044 | 42 | 0.55559 | 85 | 0.10937 | 91 | 0.0646 | | | | |
| 0 | 54 | 2 | 27 | 0.40147 | 42 | 0.59853 | | | | | | | | |
| 0 | 55 | 2 | 27 | 0.26105 | 42 | 0.73895 | | | | | | | | |
| 0 | 56 | 4 | 27 | 0.27044 | 42 | 0.55559 | 85 | 0.10937 | 91 | 0.0646 | | | | |
| 0 | 57 | 2 | 27 | 0.40216 | 42 | 0.59784 | | | | | | | | |
| 0 | 58 | 2 | 27 | 0.32084 | 42 | 0.67916 | | | | | | | | |
| 0 | 59 | 2 | 27 | 0.17308 | 42 | 0.82692 | | | | | | | | |
| 0 | 60 | 2 | 27 | 0.32573 | 42 | 0.67427 | | | | | | | | |
| 0 | 61 | 2 | 27 | 0.17308 | 42 | 0.82692 | | | | | | | | |
| 0 | 62 | 2 | 27 | 0.17308 | 42 | 0.82692 | | | | | | | | |
| 0 | 63 | 3 | 22 | 0.47143 | 28 | 0.36942 | 91 | 0.15914 | | | | | | |
| 0 | 64 | 4 | 27 | 0.3111 | 42 | 0.53559 | 85 | 0.07665 | 91 | 0.07665 | | | | |
| 0 | 65 | 3 | 22 | 0.47143 | 28 | 0.36942 | 91 | 0.15914 | | | | | | |
| 0 | 66 | 2 | 27 | 0.22581 | 42 | 0.77419 | | | | | | | | |
| 0 | 67 | 2 | 22 | 0.77437 | 28 | 0.22563 | | | | | | | | |
| 0 | 68 | 1 | 28 | 1 | | | | | | | | | | |
| 0 | 69 | 2 | 22 | 0.6184 | 28 | 0.3816 | | | | | | | | |
| 0 | 70 | 6 | 28 | 0.23985 | 33 | 0.17704 | 85 | 0.15435 | 89 | 0.15435 | 91 | 0.15435 | 93 | 0.12005 |
| 0 | 71 | 2 | 22 | 0.56848 | 28 | 0.43152 | | | | | | | | |
| 0 | 72 | 2 | 27 | 0.26721 | 42 | 0.73279 | | | | | | | | |

A series of network simulations were conducted using the ns2 public domain network simulation package. This package provides detailed propagation and channel access models for several radio-based physical and link layer technologies, including the currently popular 802.11 series of wireless networking devices.

Figure 20:
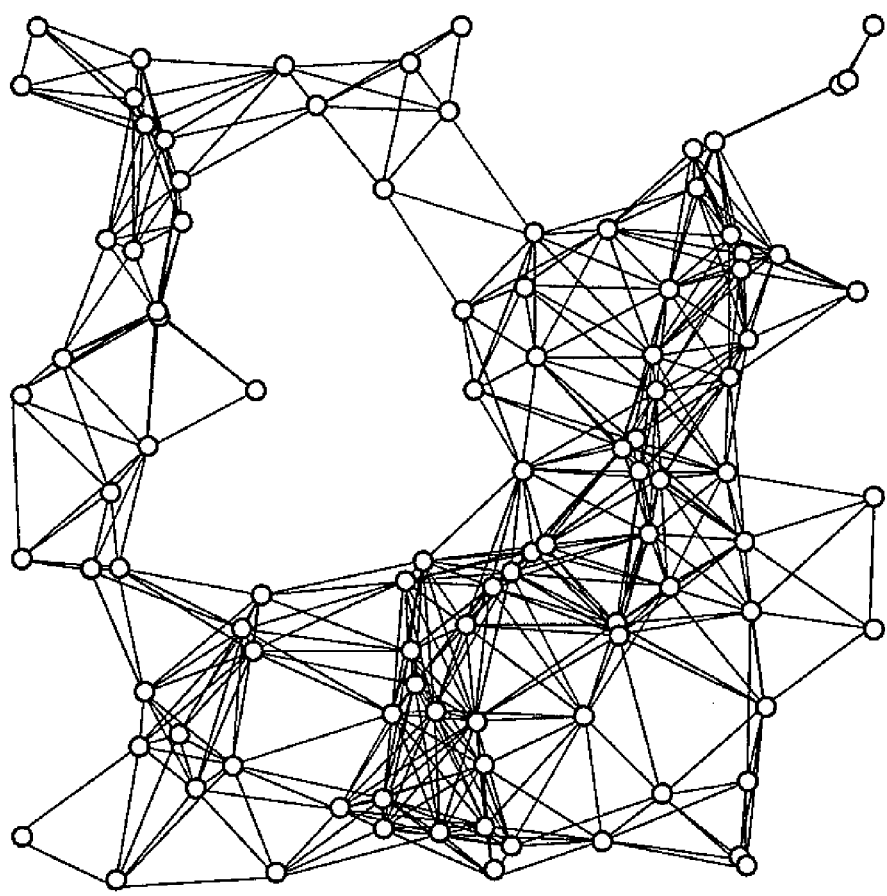
FIG. 20 illustrates another example 100 node wireless network topology.

For these simulations, the FIG. 20 100-node topology was selected at least partially because of the distinct middle where there are no nodes, thus requiring the routing schemes to route accordingly.

For the first set of simulation experiments, 400 "flows" were randomly chosen including fixed length (e.g., 50 packet, ~50 Kbyte) TCP-based transfers between randomly selected sender and receiver pairs. Although this number of flows may be small compared to the total number of possible flows (100 senders to 99 receivers, for 9900 possible flows), it is sufficient to compare the different routing strategies. The simulation was configured to use the nominal 802.11 parameters for cutoff distance (250 m) and base data rate (1 Mbps) for all nodes. In general, the typical throughput for a single, isolated flow across multiple hops was on the order of 160 Kbps (or roughly 20 kilobytes per second). The typical duration of an isolated transfer (without any intervening losses) was on the order of 2.5 seconds.

The start time of each flow in the sequence of flows was controlled by an "average inter-arrival time" parameter, which provided coarse control over the simultaneous load. Large inter-arrival spacing (e.g., 5 seconds) provided a lightly loaded network condition. A more moderate inter-arrival time (e.g., 2.5 seconds) represented a more moderately loaded network condition. A small inter-arrival time (e.g., 1 second) corresponds to a more heavily loaded network. All experiments were run for the three inter-arrival times of 5 seconds, 2.5 seconds, and 1 second.

This experimental configuration was used to gauge the differences for the routes constructed by the maximum lifetime approach using the simplex method (MTS), the maximum lifetime approach using the interior point method (MTI), the minimum latency approach (ML), the lifetime-constrained minimum latency approach (TCML), and the optimal PALMS approach (OP). The results of the simulation runs are provided in Table 3 for the three different inter-arrival times.

TABLE 3

| Approach | 5 s Inter-arrival times | | | 2.5 s Inter-arrival times | | | 1 s Inter-arrival times | | |
| --- | --- | --- | --- | --- | --- | --- | --- | --- | --- |
| | Avg Goodput (kbps) | Avg Latency (ms) | Max Load (pkts) | Avg Goodput (kbps) | Avg Latency (ms) | Max Load (pkts) | Avg Goodput (kbps) | Avg Latency (ms) | Max Load (pkts) |
| MTS | 143 | 73 | 2804 | 103 | 74 | 3062 | 76 | 75 | 3317 |
| MTI | 42 | 99 | 4909 | 33 | 101 | 5356 | 24 | 101 | 5681 |
| ML | 163 | 64 | 6635 | 129 | 64 | 6986 | 95 | 65 | 7712 |
| TCML | 161 | 64 | 2608 | 125 | 65 | 2767 | 90 | 65 | 3061 |
| OP | 158 | 62 | 3172 | 130 | 63 | 3352 | 81 | 66 | 3810 |

As Table 3 indicates, the minimum latency, lifetime-constrained minimum latency, and optimal PALMS approaches have similar latencies and throughputs, all of which are better than the maximum lifetime approaches, with the simplex-based solution proving substantially better than the interior point solution. The simplex-based maximum lifetime, lifetime-constrained minimum latency, and optimal PALMS approaches have similar maximum node loads of approximately 3000 for the simulation examples, all of which are better than the minimum latency routing approach which has over twice the load. The interior-point based solution to the maximum lifetime problem performs relatively poorly with respect to the node loading (even though it still outperforms the minimum latency approach); however closer inspection reveals that the elevated load is caused by the increased loss probability induced by the considerably longer average path lengths produced by the interior point solution, such that the elevated packet counts are actually due to retransmissions of lost packets.

Based on these results, the lifetime-constrained minimum latency solution and the optimal PALMS solution provide the comparatively best results, with essentially the same performance to within experimental error. Although the lifetime-constrained minimum latency solution appears to provide better maximum node loading, this is a side effect caused by channel contention between peers that arises in 802.11 systems causing an elevated number of dropped packets requiring retransmission (unipath routes give rise to less peer contention than do multipath routes). Since this is a well-known problem that the 802.11 community is working to address to improve peer-to-peer networking, the similarity of these results is encouraging. Both approaches produce node loadings that are less than half that produced by traditional minimum latency routing techniques, and both approaches produce latencies which are approximately half that produced by newer, energy-preserving maximum lifetime routing techniques.

For the second simulation experiment, two widely separated sender-receiver pairs were selected as the only providers of traffic within the example network. This configuration was intended to evaluate the performances of the various routing schemes under traffic conditions that are clearly mismatched to the original design assumptions (e.g., equal traffic between all possible node pairs). TCP-based flows were used. The results of the simulation runs are provided in Table 4.

TABLE 4

| Approach | Avg Goodput (kbps) | Avg Latency (ms) | Max Load (pkts) |
| --- | --- | --- | --- |
| MTS | 37 | 157 | 1574 |
| MTI | 4 | 225 | 1313 |
| ML | 53 | 99 | 1504 |
| TCML | 44 | 100 | 1506 |
| OP | 63 | 101 | 858 |

Table 4 indicates the value of the multipath routing, where the optimal PALMS configuration produces a maximum node load which is approximately half that of the other techniques. Further, the differences in average latencies between optimal PALMS and the minimum latency solutions are negligible, and optimal PALMS also has the best throughput of all five techniques.

It can be further appreciated that another benefit of pre-calculating multipath routes is an immediate access to backup routes when a particular node or link fails. As such, the developed technologies can be applied to embodiments and/or applications outside wireless environment where energy consumption is a consideration, including for example, wired networking environments, HVAC routing on-board ships, automobile traffic engineering, and other routing embodiments.

Figure 23:
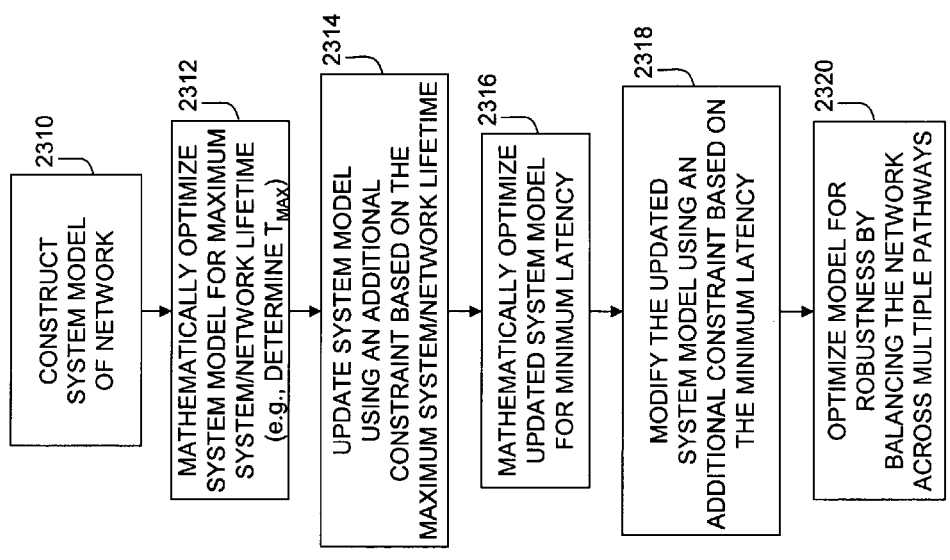
FIG. 23 illustrates a flow diagram for one embodiment of the disclosed methods and systems; and, FIG. 24 illustrates one computationally efficient embodiment of the disclosed methods and systems.

FIG. 23 illustrates one example diagram of the disclosed methods and systems. With reference to FIG. 23, and as provided herein, a system model of a network can be constructed 2310 and mathematically optimized 2312 based on maximizing system lifetime. The system model can thus be updated 2314 using an additional constraint that is based on the maximum system lifetime. As indicated further in FIG. 23, the updated system model can be optimized for minimum latency 2316, and the system model can be further modified with an additional constraint based on the minimum latency 2318. The further modified system modified can thus be optimized for robustness by balancing the network across multiple pathways 2320. As provided herein, in one embodiment, such balancing can be performed by employing the aforementioned quadratic programming to provide weights associated with the transmission cost between nodes, although such quadratic programming example is provided for illustration and not limitation, as other techniques for balancing the network can be used.

In considering the cost of performing the routing calculations, it can be appreciated that calculations that take excessive time are of little use in a MANET environment, especially given that node mobility requires that routing information be updated frequently to assure that calculated routes reflect the changing topology.

Figure 21:
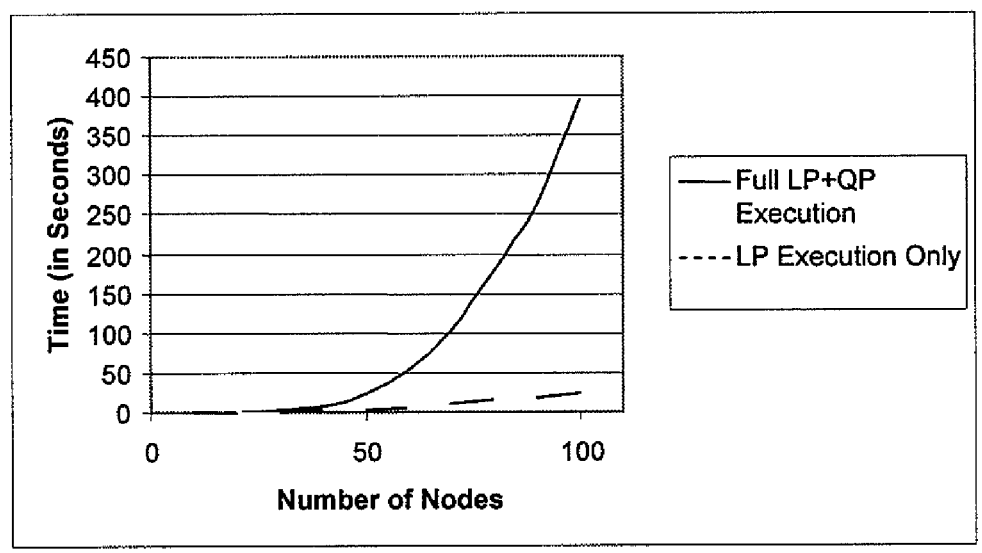
FIG. 21 shows run-times based on number of nodes in a network for Linear and Quadratic Programming portions of PALMS.
Figure 22:
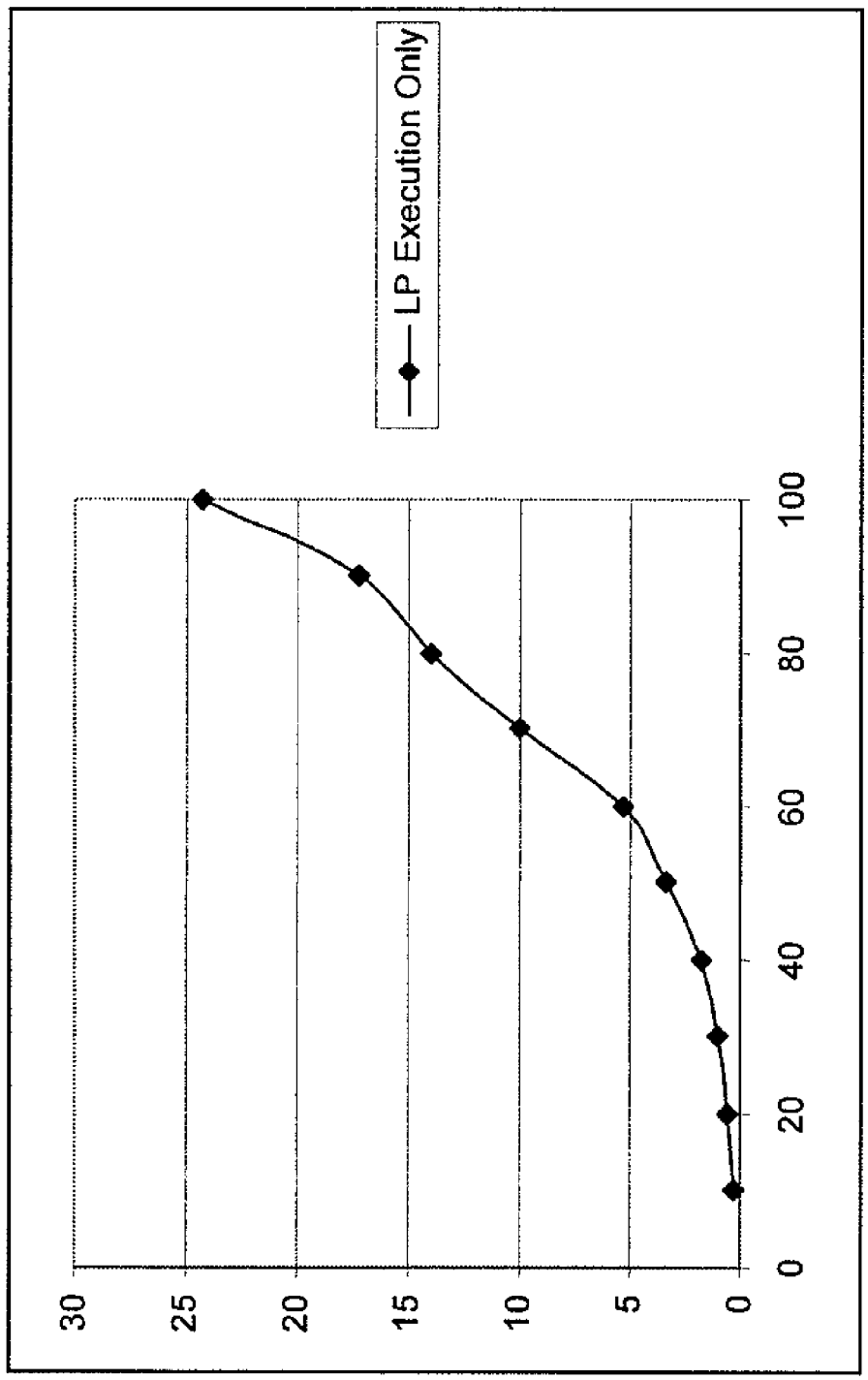
FIG. 22 illustrates run-times for the LP solver only.

FIG. 21 shows run-times based on number of nodes in the network for the Linear Programming and the combined Linear and Quadratic Programming portions of the routing schemes presented herein. To be effective in a MANET environment (e.g., account for topology changes, avoid excessively loading the mobile devices with non-routing tasks, etc.), routing calculations must take less than a few tens of milliseconds. Even routing approaches that only employ Linear Programming problem solvers (FIG. 22) can include excessive run-times even for very small topologies.

To address this concern, an approximate form of the optimal PALMS approach that uses a dynamic programming based technique can be employed. The current version of the fast PALMS scheme derives from the core Dijkstra scheme.

With regard to Dijkstra, given a connected graph G=(N,L) with node set N and link set L, a set of weights $d_l>0$ for each link, and some fixed node s in N, find a shortest path from s to each node v in N. Dijkstra's scheme is an iterative procedure that at each stage selects a node from the set of remaining, as yet unselected nodes that have the smallest cost to reach core node s. With this overview in mind, the Dijkstra scheme proceeds as:

(1) Construct a "selected" node list S that will contain those nodes for which an optimal route to core node s has already been identified, along with its corresponding optimal downstream "nexthop" to reach the core and an associated cost to reach the core through that nexthop. Initially this list contains only the core node s, a nexthop that is itself, and its cost to reach the core (itself) through that nexthop which is zero.

(2) Next, construct an "available" node list A that will contain those nodes which have been selected and also have neighbors which have not yet been selected. Initially this list also contains only the core node s.

(3) For each node n in A, compute the cost for each of n's as-yet unselected neighbors to reach the core through n. The cost for some neighbor m to reach the core through n is identically n's cost to reach the core plus the cost dl of traversing the link l' connecting m and n. The node $n_i$ and neighbor $m_j$ pair with the lowest cost determines that neighbor node $m_j$ is the next node to be selected.

(4) "Select" node $m_j$ by adding it to S, recording its nexthop to the core (i.e., node $n_i$), and its corresponding cost to reach the core through that nexthop (i.e., $n_i$'s cost to reach the core plus the cost dl of traversing the link l.)

(5) Once neighbor node $m_j$ has been selected, if node $n_i$ has no more remaining unselected neighbors, it is removed from A. If node $m_j$ itself has any neighbors which have not yet been selected, it is added to A.

(6) If A is now empty, the scheme is complete; otherwise, repeat, starting at (3).

The Dikstra scheme can thus be modified to create the approximate PALMS scheme as follows: Once a neighbor node $m_j$ has been identified in (3), construct a complete list of all of $m_j$'s neighbors that (a) have already been selected and (b) which yield a cost to reach the core that is within $(1+\gamma)$ of the cost to reach the core through $n_i$ for some small $\gamma \geq 0$. This list constitutes a set of alternative nexthops that can be used to reach s from node $m_j$, that are guaranteed to be downstream from $m_j$, (e.g., since they have already been selected and hence will not produce routing loops). The remainder of the scheme remains unchanged.

Figure 24:
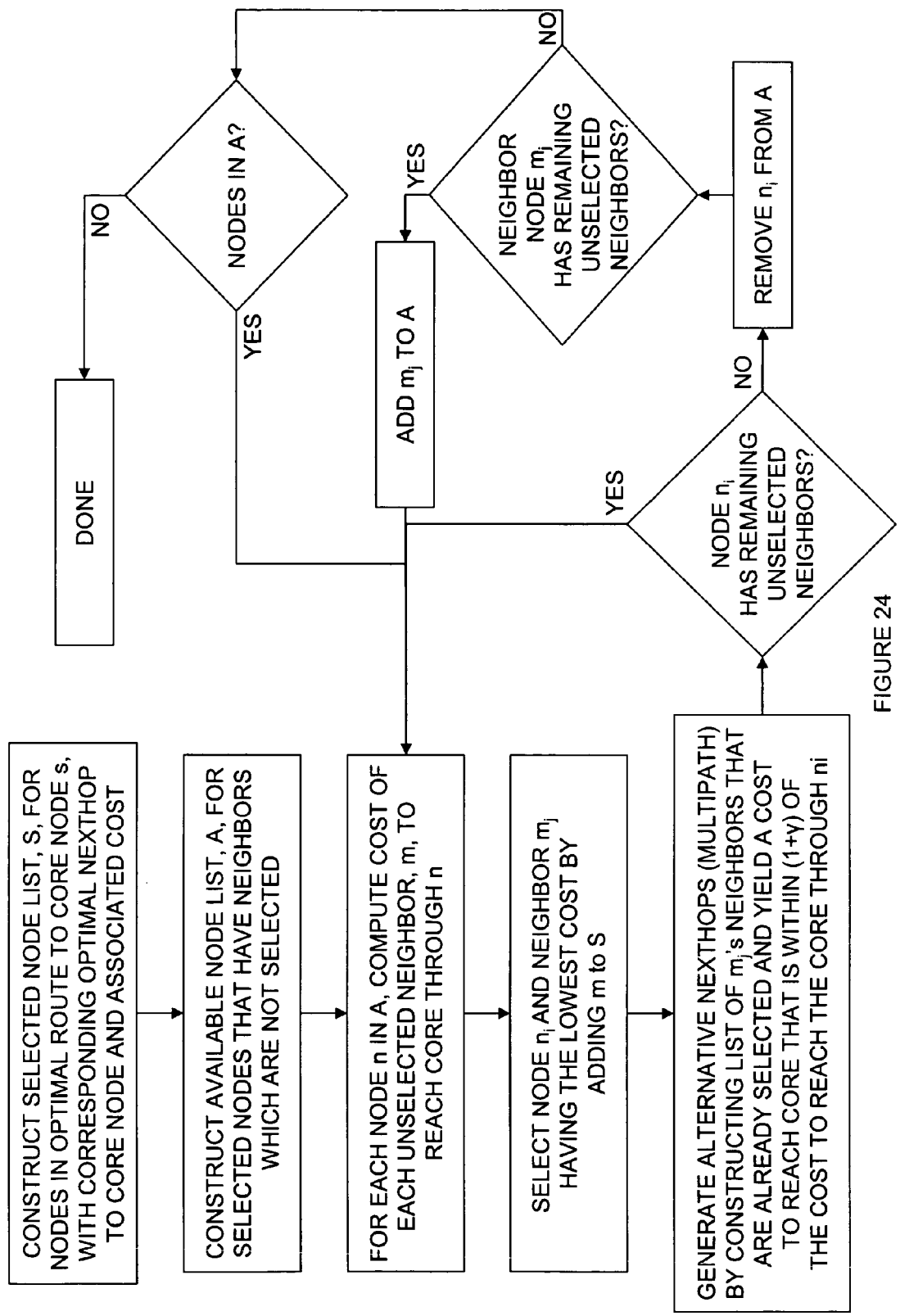

Once that scheme terminates at (6), a suitable set of weights for distributing traffic across the alternative set of nexthops is identified. The weights for the downstream paths can be set so that they are equal and sum to 1.0, e.g., the weights are 1.0 divided by the total number of nexthops. The foregoing scheme is illustrated in FIG. 24.

While improved schemes can be further created for constructing weights with better load distribution properties in the presence of multiple competing flows, the presented scheme provides the best spreading when there is only a single flow while bounding system latency. It can be understood that setting $\gamma=0$ can guarantee that the multipath solution achieves the minimum system latency possible.

Table 5 is the same as Table 3 with the addition of the approximate PALMS scheme ("Fast Palms", or "FP"). As Table 5 indicates, Fast PALMS has comparable throughput and latencies to the minimum latency, lifetime constrained minimum latency, and the Optimal PALMS approaches, and has a maximum node loading that, while not as good as lifetime constrained minimum latency and the Optimal PALMS approaches, is considerably better than the minimum latency solution and better than the interior point solution to the maximum lifetime problem.

TABLE 5

| Approach | 5 s Inter-arrival times | | | 2.5 s Inter-arrival times | | | 1 s Inter-arrival times | | |
|---|---|---|---|---|---|---|---|---|---|
| | Avg Goodput (kbps) | Avg Latency (ms) | Max Load (pkts) | Avg Goodput (kbps) | Avg Latency (ms) | Max Load (pkts) | Avg Goodput (kbps) | Avg Latency (ms) | Max Load (pkts) |
| MTS | 143 | 73 | 2804 | 103 | 74 | 3062 | 76 | 75 | 3317 |
| MTI | 42 | 99 | 4909 | 33 | 101 | 5356 | 24 | 101 | 5681 |
| ML | 163 | 64 | 6635 | 129 | 64 | 6986 | 95 | 65 | 7712 |
| TCML | 161 | 64 | 2608 | 125 | 65 | 2767 | 90 | 65 | 3061 |
| OP | 158 | 62 | 3172 | 130 | 63 | 3352 | 81 | 66 | 3810 |
| FP | 157 | 62 | 4367 | 116 | 61 | 4558 | 89 | 67 | 4935 |

What has thus been described are methods, systems, and processor program products for determining a set of costs of routes in a network, including providing a model of the network, optimizing the model based on maximum network lifetime, updating the model using a constraint based on the maximum network lifetime, optimizing the updated model for minimum network latency, modifying the updated model using a constraint based on the minimum network latency, and, optimizing the modified updated model by balancing the network across multiple pathways to provide costs of routes in the network. Also disclosed are methods, systems, and processor program products for determining a set of costs of routes in a network by constructing a list of selected nodes that includes nodes for which an optimal route to a core node is identified, associating therewith a nexthop to reach the core node and a cost to reach the core node through the nexthop, constructing a list of available nodes which have been selected and have neighbors which have not been selected, for each of the available nodes, identifying an available node and computing a cost of each unselected neighbor to reach the core node through the identified available node, selecting the identified available node and unselected neighbor having the lowest cost, generating alternative nexthops by constructing a list of selected neighbors having a cost to reach the core through the identified available node, the cost within a threshold, removing the identified available node from the available node list if the identified available node has unselected neighbors, adding the unselected neighbor having the lowest cost to the available node list if said neighbor node has unselected neighbors, and, returning to identifying an available node until the available node list is empty.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be conFigured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be conFigured to communicate via wired or wireless communications with other processors, where such one or more processor can be conFigured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the Figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. For example, although the illustrated embodiments indicate that the network is a computer network and that the "traffic" on such example networks is data, the disclosed methods and systems are not so limited, and other types of networks (e.g., roadways, etc.) with other types of "traffic" are encompassed by the disclosed methods and systems. Further, although the illustrated embodiments included quadratic programming to balance the network and derive the network weights, other techniques for balancing the network are within the scope of the disclosed methods and systems.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method for determining a set of costs of routes in a network, the method comprising:
   providing a model of the network,
   optimizing the model for maximum network lifetime, wherein the network lifetime is a length of time until any network node's energy source is completely exhausted,
   updating the model using at least one constraint based on the maximum network lifetime,
   optimizing the updated model for minimum network latency,
   modifying the updated model using at least one constraint based on the minimum network latency, and,
   optimizing the modified updated model by balancing the network across multiple pathways to provide the costs,
   where optimizing the model for maximum network lifetime includes determining a maximum network lifetime.

2. A method according to claim 1, where updating the model using at least one constraint based on the maximum network lifetime includes:
   constraining the model based on a percentage of the maximum network lifetime, the percentage between zero and one-hundred.

3. A method for determining a set of costs of routes in a network, the method comprising:
   providing a model of the network,
   optimizing the model for maximum network lifetime, wherein the network lifetime is a length of time until any network node's energy source is completely exhausted,
   updating the model using at least one constraint based on the maximum network lifetime,
   optimizing the updated model for minimum network latency,
   modifying the updated model using at least one constraint based on the minimum network latency, and,
   optimizing the modified updated model by balancing the network across multiple pathways to provide the costs,
   where optimizing the updated model for minimum network latency comprises determining a minimum number of relays to communicate information between network nodes based on the maximum network lifetime.

4. A method according to claim 3, where modifying the updated model using at least one constraint based on the minimum network latency includes:
   constraining the updated model based on a percentage of the amount of information, the percentage between zero and one-hundred.

5. A method according to claim 3, where modifying the updated model using at least one constraint based on the minimum network latency includes:
   constraining the updated model based on a multiplier of the number of relays.

6. A method for determining a set of costs of routes in a network, the method comprising:
   providing a model of the network,
   optimizing the model for maximum network lifetime, wherein the network lifetime is a length of time until any network node's energy source is completely exhausted,
   updating the model using at least one constraint based on the maximum network lifetime,
   optimizing the updated model for minimum network latency,
   modifying the updated model using at least one constraint based on the minimum network latency, and,
   optimizing the modified updated model by balancing the network across multiple pathways to provide the costs,
   where optimizing the modified updated model by balancing the network across multiple pathways includes optimizing using quadratic programming.

7. A method for determining a set of costs of routes in a network, the method comprising:
   providing a model of the network,
   optimizing the model for minimum network latency,
   updating the model using at least one constraint based on the minimum network latency,
   optimizing the updated model for maximum network lifetime, wherein the network lifetime is a length of time until any network node's energy source is completely exhausted,
   modifying the updated model using at least one constraint based on the maximum network lifetime, and,
   optimizing the modified updated model by balancing the network across multiple pathways to provide the costs
   where optimizing the model for minimum network latency comprises determining a minimum number of relays to communicate information between network nodes.

8. A method according to claim 7, where updating the model includes:
   constraining the model based on a percentage of the amount of information, the percentage between zero and one-hundred.

9. A method according to claim 7, where updating the model includes:
   constraining the model based on a multiplier of the number of relays.

10. A method for determining a set of costs of routes in a network, the method comprising:
    providing a model of the network,
    optimizing the model for minimum network latency,
    updating the model using at least one constraint based on the minimum network latency,
    optimizing the updated model for maximum network lifetime, wherein the network lifetime is a length of time until any network node's energy source is completely exhausted,
    modifying the updated model using at least one constraint based on the maximum network lifetime, and,
    optimizing the modified updated model by balancing the network across multiple pathways to provide the costs
    where optimizing the updated model for maximum network lifetime includes determining a maximum network lifetime.

11. A method according to claim 10, where modifying the updated model using at least one constraint based on the maximum network lifetime includes:
    constraining the updated model based on a percentage of the maximum network lifetime, the percentage between zero and one-hundred.

12. A method for determining a set of costs of routes in a network, the method comprising:
    providing a model of the network,
    optimizing the model for minimum network latency,
    updating the model using at least one constraint based on the minimum network latency,
    optimizing the updated model for maximum network lifetime, wherein the network lifetime is a length of time until any network node's energy source is completely exhausted,
    modifying the updated model using at least one constraint based on the maximum network lifetime, and,
    optimizing the modified updated model by balancing the network across multiple pathways to provide the costs where optimizing the modified updated model by balancing the network across multiple pathways includes optimizing using quadratic programming.

13. A processor program product disposed on a processor readable medium, and having instructions for causing at least one processor to:
   optimize a model of a network for maximum network lifetime, wherein the network lifetime is a length of time until any network node's energy source is completely exhausted,
   update the model using at least one constraint based on the maximum network lifetime,
   optimize the updated model for minimum network latency,
   modify the updated model using at least one constraint based on the minimum network latency, and,
   optimize the modified updated model by balancing the network across multiple pathways to provide the costs,
   where the instructions to optimize the model for maximum network lifetime include instructions to determine a maximum network lifetime.

14. A processor program product according to claim 13, where the instructions to update the model using at least one constraint based on the maximum network lifetime include instructions to:
   constrain the model based on a percentage of the maximum network lifetime, the percentage between zero and one-hundred.

15. A processor program product disposed on a processor readable medium, and having instructions for causing at least one processor to:
   optimize a model of a network for maximum network lifetime, wherein the network lifetime is a length of time until any network node's energy source is completely exhausted,
   update the model using at least one constraint based on the maximum network lifetime,
   optimize the updated model for minimum network latency,
   modify the updated model using at least one constraint based on the minimum network latency, and,
   optimize the modified updated model by balancing the network across multiple pathways to provide the costs,
   where instructions to optimize the updated model for minimum network latency comprises instructions to determine a minimum number of relays to communicate information between network nodes based on the maximum network lifetime.

16. A processor program product according to claim 15, where the instructions to modify the updated model using at least one constraint based on the minimum network latency include instructions to:
   constrain the updated model based on a percentage of the amount of information, the percentage between zero and one-hundred.

17. A processor program product according to claim 15, where the instructions to modify the updated model using at least one constraint based on the minimum network latency include instructions to:
   constrain the updated model based on a multiplier of the number of relays.

18. A processor program product disposed on a processor readable medium, and having instructions for causing at least one processor to:
   optimize a model of a network for maximum network lifetime, wherein the network lifetime is a length of time until any network node's energy source is completely exhausted,
   update the model using at least one constraint based on the maximum network lifetime,
   optimize the updated model for minimum network latency,
   modify the updated model using at least one constraint based on the minimum network latency, and,
   optimize the modified updated model by balancing the network across multiple pathways to provide the costs,
   where the instructions to optimize the modified updated model by balancing the network across multiple pathways include instructions to optimize using quadratic programming.

19. A method for computing a set of costs of routes in a network, the method comprising:
   constructing a list of selected nodes that includes nodes for which an optimal route to a core node is identified, associating therewith a nexthop to reach the core node and a cost to reach the core node through the nexthop,
   constructing a list of available nodes which have been selected and have neighbors which have not been selected,
   for each of the available nodes, identifying an available node and computing a cost of each unselected neighbor to reach the core node through the identified available node,
   selecting the identified available node and unselected neighbor having the lowest cost,
   generating alternative nexthops by constructing a list of selected neighbors having a cost to reach the core through the identified available node, the cost within a threshold,
   removing the identified available node from the available node list if the identified available node has no unselected neighbors,
   adding the unselected neighbor having the lowest cost to the available node list if said neighbor node has unselected neighbors, and,
   returning to identifying an available node until the available node list is empty.

* * * * *

UNITED STATES PATENT AND TRADEMARK OFFICE
CERTIFICATE OF CORRECTION

PATENT NO. : 7,391,742 B2 Page 1 of 1
APPLICATION NO. : 10/955466
DATED : June 24, 2008
INVENTOR(S) : Steven M. Zabele et al.

It is certified that error appears in the above-identified patent and that said Letters Patent is hereby corrected as shown below:

Title page, item (75) Inventors: should read as follows: Stephen Zabele, North Reading, MA Signed and Sealed this Twenty-first Day of October, 2008

JON W. DUDAS
*Director of the United States Patent and Trademark Office*